US011527109B1

(12) United States Patent
Ramasarma et al.

(10) Patent No.: US 11,527,109 B1
(45) Date of Patent: Dec. 13, 2022

(54) FORM ANALYSIS SYSTEM

(71) Applicant: ArcSecond, Inc., San Diego, CA (US)

(72) Inventors: Vaidyanathan P. Ramasarma, San Diego, CA (US); Adam Varga, Csetény (HU); Jozsef Petenyi, San Diego, CA (US); Bence Jozsef Borbely, Budapest (HU); Ferenc Plutzer, Veszprém (HU); Daniel Banyay, Budapest (HU); Ali A. Hashemi, Dubai (AE)

(73) Assignee: ARCSECOND, INC., San Diego, CA (US)

( * ) Notice: Subject to any disclaimer, the term of this patent is extended or adjusted under 35 U.S.C. 154(b) by 0 days.

(21) Appl. No.: 17/142,681

(22) Filed: Jan. 6, 2021

Related U.S. Application Data

(60) Provisional application No. 62/958,190, filed on Jan. 7, 2020.

(51) Int. Cl.
| | |
|---|---|
| G06V 40/20 | (2022.01) |
| H04W 4/38 | (2018.01) |
| G06T 13/40 | (2011.01) |
| A41D 1/00 | (2018.01) |
| H04W 88/08 | (2009.01) |
| G06F 3/01 | (2006.01) |
| G06T 13/80 | (2011.01) |

(52) U.S. Cl.
CPC ............. *G06V 40/25* (2022.01); *A41D 1/005* (2013.01); *G06F 3/011* (2013.01); *G06T 13/40* (2013.01); *G06T 13/80* (2013.01); *H04W 4/38* (2018.02); *H04W 88/085* (2013.01)

(58) Field of Classification Search
CPC ......... G06V 40/25; A41D 1/005; G06F 3/011; G06T 13/40; G06T 13/80; H04W 4/38; H04W 88/085
See application file for complete search history.

(56) References Cited

U.S. PATENT DOCUMENTS

| | | | |
|---|---|---|---|
| 2009/0055019 A1 | 2/2009 | Steihl et al. | |
| 2012/0246795 A1* | 10/2012 | Scheffler | A61B 5/0002 2/243.1 |
| 2013/0198867 A1* | 8/2013 | Ricci | G06F 21/6218 726/29 |
| 2013/0332065 A1 | 12/2013 | Hakim et al. | |
| 2014/0172134 A1* | 6/2014 | Meschter | G01L 1/205 73/865.4 |
| 2015/0366504 A1* | 12/2015 | Connor | A61B 5/6804 600/301 |
| 2018/0180417 A1 | 6/2018 | Askarpour | |
| 2019/0212359 A1 | 7/2019 | Erivanteev et al. | |
| 2020/0000377 A1 | 1/2020 | Ly et al. | |

* cited by examiner

*Primary Examiner* — Premal R Patel
(74) *Attorney, Agent, or Firm* — Knobbe, Martens, Olson & Bear LLP

(57) ABSTRACT

Methods and systems for monitoring and measuring form. A form analysis system can include a flexible garment, a sensor array including two or more sensors positioned on portions of the garment such that at least two of the two or more sensors are positioned on garment such that they align with body parts of the wearer of the garment that are separated by a joint, a harness coupled to the sensor array, the harness having stretchable wiring for communicating signals generated by the sensor array, and a hub coupled to the harness and configured to receive signals from the sensor array, the hub including a transmitter to transmit received signals to a base station.

19 Claims, 32 Drawing Sheets

Base Station

- multiple hub slots for offline data download & charging
- Bluetooth connection to multiple hubs for real-time data streaming or exercise pass/fail signaling

- high level SW:
  - computational back-end (CBE): currently handles all motion reconstruction related tasks including initial pose calibration, real time avatar reconstruction based on an anatomically correct model and all use case specific algorithms
  - use cases:
    - free form: based on sensor node quaternions, enables the calculation of real-time metrics and immediate avatar display
    - post game markers: based on calibrated sensor data, independent of the ambient magnetic field but also tailored to specific movement patterns (i.e. it is not a generic motion reconstruction solution)
    - activation: based on calibrated sensor data, exercise detection & assessment based on standard scoring systems (e.g. FMS)

FIGURE 15

FORM ANALYSIS SYSTEM

CROSS-REFERENCE TO RELATED APPLICATIONS

The present application claims the benefit of U.S. Provisional Patent Application No. 62/958,190, filed Jan. 7, 2020, and titled FORM ANALYSIS SYSTEM, which is incorporated herein by reference in its entirety under 37 C.F.R. § 1.57. Any and all applications for which a foreign or domestic priority claim is identified in the Application Data Sheet as filed with the present application are hereby incorporated by reference under 37 C.F.R. § 1.57.

BACKGROUND OF THE INVENTION

This invention relates to a form analysis system that includes a garment having a plurality of has sensors for capturing the form of the wearer of the garment. Specifically, this invention relates to a form analysis system comprising tights with multiple sensors aligned with portions of a wearer's body to collect data related to the form and the motion of the wearer of the tights.

SUMMARY OF THE INVENTION

Various aspects of the present invention includes inventive features and embodiments to allow detection and measurement of a person's form while the person is performing an activity. Such activities can include an exercise, an athletic activity or training for an athletic activity, yoga, physical therapy, or a non-athletic activity such as walking, sitting laying down, stretching, eating, drinking or any activity that involves moving or positioning one or more limbs. An example of one innovation includes a system for sensing the form of the person engaged in the activity, the system including a flexible garment, a sensor array including two or more sensors positioned on portions of the garment such that at least two of the two or more sensors are positioned on garment such that they align with body parts of the wearer of the garment that are separated by a joint, a harness coupled to the sensor array, the harness having stretchable wiring for communicating signals generated by the sensor array; and a hub coupled to the harness and configured to receive signals from the sensor array, the hub including a transmitter to transmit received signals to a base station.

Various embodiments of the system can include a variety of features. For example, in some embodiments the garment is configured such that when worn by a person, the garment covers a portion of the person's feet, shins, femurs, and sacrum. The sensor array can include seven sensors, although in some embodiments the sensor array includes more than seven sensors, or less than seven sensors. The sensor array can be positioned on the garment such that sensors of the sensor array area aligned with the person's feet, shins, femurs, and sacrum. The sensors of the sensor array can include an accelerometer, a gyroscope, and/or a magnetometer. In some embodiments, the sensors of the sensor array all include the same sensors (e.g., an accelerometer, a gyroscope, and a magnetometer). In some embodiments, the sensors of the sensor array are configured at least somewhat differently, that is, a sensor in the sensor array can include one or more different sensors than at least one other sensor in the sensor array. In some embodiments, the sensors in the sensor array include an accelerometer and a magnetometer. In some embodiments, the sensors in the sensor array include an accelerometer and a gyroscope. In some embodiments, the sensors in the sensor array include a gyroscope, and a magnetometer.

Other sensors can be used in the form analysis system, in any combination with the other sensors disclosed herein or other sensors. In some embodiments, one or more or the sensors can include a sensor configured to collect data relating to pressure, heart rate, temperature, ultraviolet light, light, infrared light, sounds, acoustic energy, blood glucose, or G-forces. In some embodiments, one or more or the sensors can include a sensor configured to collect data relating to a type of motion (e.g., functional, dynamic, center of gravity, acceleration, impact, balance, load, and/or gait). In some embodiments, one or more or the sensors can include a sensor configured to collect data relating to a biometric condition, for example, heart rate, pulse oximetry, and the like. In some embodiments, one or more or the sensors can include a sensor configured to collect data relating to a physiological condition, for example, electromyography (muscle activation), Body Mass Index (BMI), galvanic skin response indicative of how much a person is sweating, which can be indicative of a hydration level, blood glucose, or center of mass. In some embodiments, one or more or the sensors can include a sensor configured to collect data relating to an emotion (or an emotional state), a person's nutrition, a person's metabolism, or genetic markers. The sensors can be combined within an implementation of a system to provide insights not possible with individual sensors.

In some embodiments, the sensors in the sensory array may not include any magnetometer, but where the intended output from a magnetometer (e.g. direction and heading) can instead be derived using raw accelerometer and gyroscope measurements coupled with advanced anatomical models of the human body and particle filtering. In some embodiments, the above magnetometer-free motion reconstruction method may involve neural network based orientation estimation. This is because magnetic disturbances are highly nonlinear and very hard to predict real-time.

In another embodiment, a form analysis system to deduce anatomical point tracking of a human body uses inverse kinematic algorithms to deduce changes in anatomical points of interest across the human body. For example, a user wearing a garment or other embodiments of the system can now assess how much pressure is applied by each individual foot on a rigid surface real-time against a specific movement pattern. A squat results in each foot applying pressure on the surface it's on. This pressure may be exerted equally or inequality across both feet. An 'ideal form' will expect to see both legs exert equal pressure through the feet on a surface while performing certain exercises. If that doesn't happen, one may deduce that the user may have 'improper form' either pointing to an anatomical imbalance or deformity either due to poor habit, or injury or recovery after injury where form is not yet back to a state prior. The system allows for such anatomical points of interest on the human body to be shown either as absolute measurements or 'heat-maps' or a 'time series' that show how multiple measurements change over time, real-time. Current methods of assessing such pressure points include using pressure mats and other dedicated apparatus. These are impractical and not portable. The system allows for wearing a garment, otherwise not different from standard garments that look and feel similar.

BRIEF DESCRIPTION OF THE DRAWINGS

FIGS. 12-15 illustrate and describe examples of data flow and levels of motion analysis of embodiments of the invention.

DETAILED DESCRIPTION OF CERTAIN INVENTIVE ASPECTS

Figure 1:
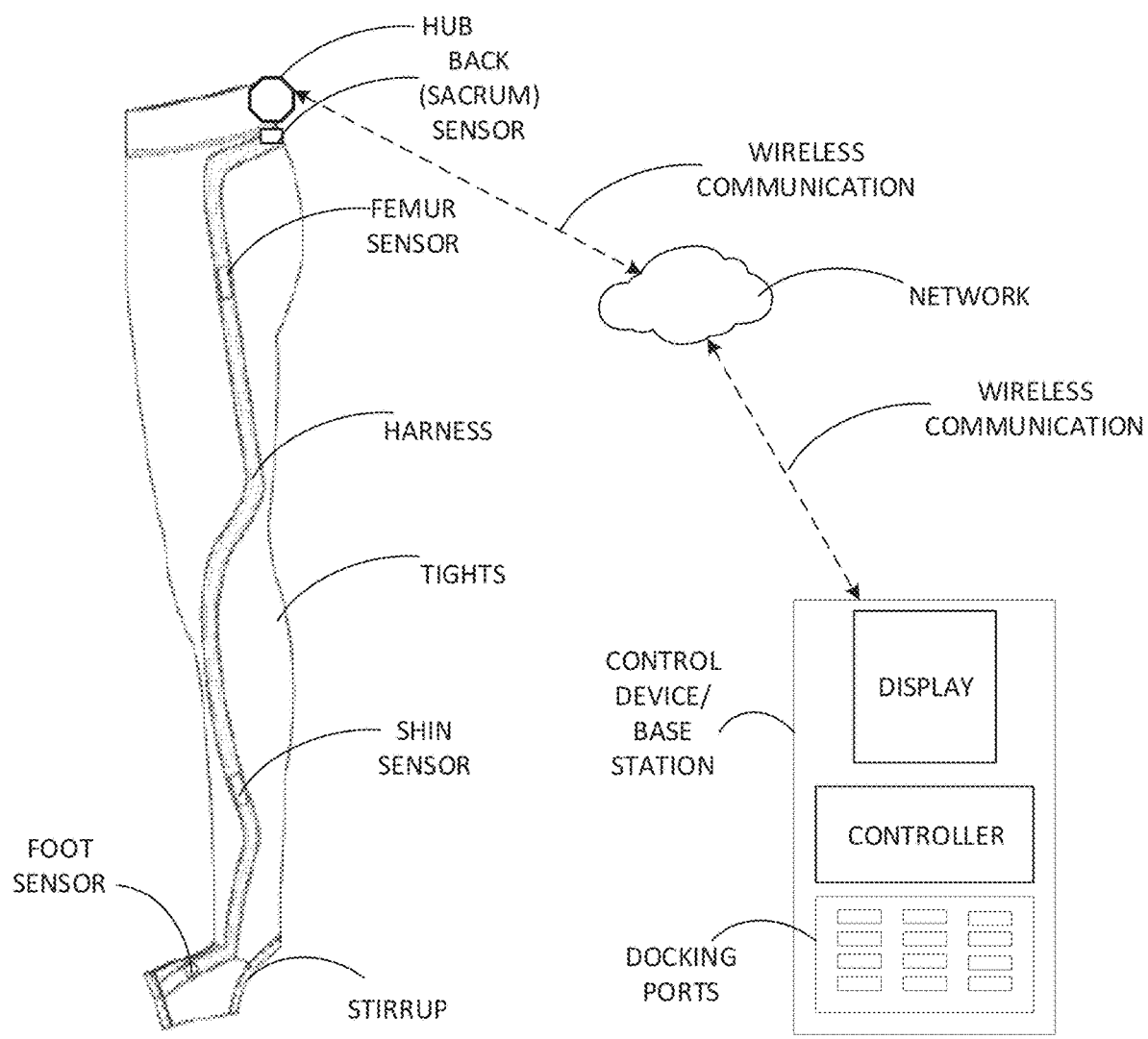
FIG. 1 is a diagram illustrating an overview of an example of the invention.

The detailed description of various exemplary embodiments below, in relation to the drawings, is intended as a description of various aspects of the various exemplary embodiments of the present invention and is not intended to represent the only aspects in which the various exemplary embodiments described herein may be practiced. The detailed description includes specific details for the purpose of providing a thorough understanding of the various exemplary embodiments of the present invention. However, it will be apparent to those skilled in the art that some aspects of the various exemplary embodiments of the present invention may be practiced without these specific details. In some instances, well-known structures and components are shown in block diagram form in order to avoid obscuring various examples of various embodiments.

Although particular aspects various exemplary embodiments are described herein, numerous variations, combinations and permutations of these aspects fall within the scope of the disclosure. Although some benefits and advantages of certain aspects are mentioned, the scope of the disclosure is not intended to be limited to particular benefits, uses or objectives.

In athletics of any kind it is often very difficult to gather completely objective information on an individual's performance. Most of these systems have major limitations that make them impractical in the normal daily practice of training and participating in the sport. Having accurate measurements that are repeatable are also a key aspect in objective evaluation. When a garment has the required elements to provide accurate, repeatable, real-time data relating the a person's from during an activity, an athlete and their support team of trainers and coaches gain meaningful insight on the performance and condition of the athlete. In most evaluation by trainers and coaches it is accomplished by watching and asking questions. Sometimes they may use very expensive camera detection systems that are not portable. There are some integrated garments yet they have limitations on accuracy and repeatability.

Embodiments of the "form analysis system" described herein can monitor and measures a person's form while they are performing an activity. Form analysis as described herein is a generally refers to a combination of various (1) predetermined conditions, (2) gradual changes and (3) instantaneous impacts to our body and mind. This makes 'form analysis' something that cannot be solved by one sensor type or quantity, rather it is a combination of multiple sensors measuring a person's form simultaneously. Although determining "motion" may be part of determining someone's functional and dynamic form, that that cannot be solved objectively with one sensor type or measurement.

In various embodiments of the system described herein, at least a portion of the harness and the sensor array are enclosed in a portion of the garment. In some implementations, the hub can include a wireless transmitter. The system can further include a base station comprising a display and one or more hardware processors. The hub can be removably attachable to the harness. In some embodiments, the base station further comprises a docking station configured to receive the hub and couple to the hub to allow communication between the hub and the base station through a direct physical connection. In some embodiments, the docking station is configured to receive a plurality of hubs and couple to the plurality of hubs to allow communication between the hubs and the base station through direct physical connections or via a wireless interface such as Bluetooth, Wi-Fi, Cellular etc. In some embodiments, the garment can directly communicate with a remote server via a cellular network (enabling a 'user-to-cloud' connectivity, not requiring a base station or other intermediate apparatus). In some embodiments, the base station is configured to generate and display an avatar representation of a wearer of the garment based on information received from a hub. In some embodiments, the garment comprises tights. In some embodiments, the garment comprises a shirt.

Form analysis systems can have additional features. For example, a hub can be integrated into the wearable device (e.g., a garment) without the hub being removable, even when the garment is cleaned. Hub or individual sensors can include a rechargeable battery that can be charged wirelessly by an apparatus that includes a receiver embedded into the garment and a transmitter embedded into a separate apparatus, the embodiments for which include a clothes hanger, fixed or portable. Methods of form analysis can utilize any of the components and systems described herein. For example, a form analysis system can be used to perform a method that identifies a user type. In another example, a form analysis system can be used to perform a method that identifies a user's an associated action or intent. Other aspects of form analysis methods that can be performed with the form analysis systems described herein include detecting the gender of the user of an apparatus. Such methods may require the system to me a wearable device. In some methods, the apparatus must be worn for it to function, and the apparatus can determine when it is worn.

In some methods, the form analysis system provides measurements in real time, or near real time. When the form analysis system is implemented in a garment, this can allow the sensors to collect information relating to the form of the wearer of the garment in the information provided to a base station for monitoring the wearer's movements in form and real-time. Information related to the wearer's movements may be provided in real time to a display that is positioned such that the wearer of the garment can view the display and monitor their form while the performing some activity. In some methods, the form analysis system functions regardless of a gender-specific design requirements of the system. In some methods, the form analysis system can operate without requiring the calibration procedure. In some methods, the form analysis system can provide measurements/results to an application programmable interface (API) which can interfaces with one or more of the devices. In some methods, the form analysis system can invoke gender specific attributes on the user interface controlling the system. In some methods, the form analysis system can determine whether the user is in the process of wearing a garment or other device in which are incorporated the sensors of the form analysis system. In some methods the form analysis system can determine whether the user is in the process of taking off the apparatus, and when doing so can stop the collection of data. In some methods, the form analysis system can monitor a person's form and predict the time it will take for user to complete a certain action.

In some embodiments, the form analysis system can provide a feedback signal to a user. For example, a form analysis system can intervene during a user's activity by way of sending an audible, vibratory, or sensory feedback via a suitable signal device embedded within the garment. In some implementations the form analysis system can have multiple signal devices. In an example, if a yoga practitioner were to perform an incorrect pose, the garment would send a sensory signal back to the user's skin alerting a poor form in that particular part of the body that needs attention or correction, thus avoiding the need to watch an avatar on a screen, which is sometimes not physically possible while performing exercises or routines.

Embodiments of a form analysis system include systems and methods for visualizing data processed from the hub and/or the base station. One innovation includes a method that extracts the amount of inter-segment rotation angles from global orientation information of individual segments of a kinematic chain. The inter-segment rotation angle representation can be defined as a tree of local transformations between chain segments in the form of offsets and consecutive axis-angle rotations between the kinematic chain's segments or in any other representation that can be transformed into that representation. The number of operations and the running time of the algorithm depends on the complexity of the kinematic structure described in the definition of the kinematic chain. The accuracy of the algorithm depends on the quality of orientation information and the level of approximations (if required) in more complex inter-segment transformations.

One specific use case of the method is the kinematic reconstruction of human movements from known (e.g., measured) orientation information of individual segments of the human body (e.g., pelvis, thigh, etc.). The general approach to this reconstruction is fitting anatomical landmarks of a virtual human body model to experimentally measured positions of the same landmarks using optical (e.g., Vicon, OptiTrack), magnetic (e.g., METAmotion) or ultrasound based (e.g., Zebris) measurement systems. By using this approach, actual hardware elements are used to mark the anatomical landmarks on the measured subject with specific markers corresponding to the measurement system's modality (e.g., using optical, magnetic or ultrasound markers) and the virtual human body model is also set up with virtual markers on the same landmarks. The fitting process of the virtual markers to the measured ones is performed through fine adjustments of the virtual human body model's inter-segment rotations until the minimum of the overall distance between the virtual and the experimentally measured marker sets is found. This process involves compute intensive numerical optimization that renders it impractical for applications where anatomical joint angles are required in real-time. In addition, standard motion capture systems constrain the measurement volume as a result of their construction (line-of-sight operation between markers and sensing elements with known spatial characteristics (e.g. cameras, electromagnetic sensors, microphones)). The claimed method solves both of these issues by: Calculating model specific joint angles from segment orientations in a direct way, requiring much less computational power than the optimization approach and Allowing and utilizing the usage of wearable sensor technology (using MARG sensors and orientation filters, e.g., Xsens) that opens the way to lab-free movement measurement and reconstruction of human body movements.

Manifestations of the Claims:

Embodiments of such methods can be implemented in a system in computer software instructions that can be executed on one or more computer hardware processors. The system can receive inputs in the form of body segment orientations. The system can use and body segment orientations and definitions of inter-segment transformations (aka. a body model) from a stored location or that are received, and provide outputs as joint angles corresponding to the inter-segment transformations of the underlying body model and the actual body pose that segment orientations describe.

EMBODIMENTS

A method or system can use a post-processing software component as part of an integrated laboratory measurement system for human movements using wearable or external sensing elements. Real-time movement reconstruction software component can be part of an integrated laboratory measurement system for human movements using wearable or external sensing elements. Post-processing software components can be a part of an integrated laboratory-free measurement system for human movements using wearable sensing elements. Real-time movement reconstruction software component as part of an integrated laboratory-free measurement system for human movements using wearable sensing elements.

Implementation Details:

Examples of Processing Steps: The kinematic chain that is subject to reconstruction has to be fully defined. This includes a direct mapping between model specific joint angle values and spatial transforms of each segment in the kinematic chain. Usually, the spatial transformation of a segment if affected by multiple joint angle values in a deterministic way (i.e. the order of rotations is fixed for all segments) and is defined locally between segments. As a result, global segment transformations can be determined by chaining the local transformations through the kinematic chain (e.g., the global spatial transformation of the thigh is determined directly by the hip angles and indirectly by the pelvis angles because the thigh is a child of the pelvis in the kinematic chain of the human lower body).

One example for such mapping is the OpenSim model format that is used as a standard description for simulation and reconstruction of human body movements across the computational biomechanics research society. Given the kinematic chain's model description, the local transformation matrix is determined for each body segment corresponding to the body joint angles subject to reconstruction (i.e., lower body, upper body, full body). In most cases (i.e., for reasonably simple joint angle→spatial transform mappings), this step can be performed analytically, resulting in a symbolic transformation matrix that includes elements that are direct functions of the body joint angles. Example: If the local rotation of a body segment is determined by three consecutive rotations about its local axes (corresponding to a simple mapping using Euler angles), the rotation part of the resulting transformation matrix can be calculated analytically with the corresponding Euler angle→rotation matrix formula. If the body joint angle→spatial transform mapping cannot be considered simple because of any reason (i.e., the rotation of the segment is non-linear with regard to body joint angles, the rotation axis is changing as a function of body joint angle value, etc.), appropriate approximation methods are used to resolve those complexities and transform numerical parts of the model into an analytical form. Example: In a given model, the angle value in one of the axis-angle rotations is determined as a nonlinear function of one of the body joint angles, represented as sampling points of a spline curve (this scenario happens often with human body models based on measurement studies like in Rajagopal et al. (2016)), a proper approximation can be done on the sampling region using a polynomial with sufficiently high degree. Given the analytical local rotation matrix corresponding to the specific body model description, body joint angle values corresponding to each body segment are derived from the elements of the rotation matrix through analytical derivation (where applicable) and/or numerical approximation, resulting in direct formulation for the calculation of body joint angles from the values of the local rotation matrices of each body segment. To get the local rotation matrices from the measured global orientations, the global orientations are converted into rotation matrices from any representation they are in initially. Following this step, each global rotation matrix is multiplied by the inverse of the rotation matrix of its parent, resulting in local rotation matrices for each measured orientation. Because the analytical rotation matrices correspond directly to the local rotation matrices derived from the measured orientations of body segments (e.g. through wearable sensor elements), the body joint angles can be calculated directly from the segments' local rotation matrices in an analytical or numerical form, depending on the complexity of the actual body joint angle→segment spatial transform mapping.

Some embodiments can include an interpolation process that recovers accurate orientation trajectories from motion-related data, even if external disturbances are present in the measurement environment (e.g., magnetic field anomalies). The process works on inputs in the form of rigid body orientations, reliability information of these orientations and angular velocity values during the course of a rigid body's movement. Reliability information of orientation data can come from various sources, depending on what type of equipment is used during data collection (e.g., estimated correctness of the external magnetic field and acceleration vectors for MARG sensors, marker loss for marker based optical systems, etc.) Given time instances when the orientations can be considered reliable and other time instances when reliability cannot be expected, the process returns an interpolated array of orientations for time windows where orientation accuracy would be impacted otherwise.

Embodiments of the Method

The process can be implemented as computer software that receives inputs in the form of orientation quaternions, reliability information of these quaternions and angular velocity values during the course of a rigid body's movement and returns interpolated quaternions that can be considered reliable for the whole movement pattern.

EMBODIMENTS

Post-processing software component as part of an integrated laboratory measurement system for rigid body movements using on-body or external sensing elements. Post-processing software component as part of an integrated laboratory measurement system for human movements using wearable or external sensing elements. "Half real-time" processing software component as part of an integrated laboratory measurement system for rigid body movements using on-body or external sensing elements. "Half real-time" processing software component as part of an integrated laboratory measurement system for human movements using wearable or external sensing elements.

FIGS. 1-29 and the Appendix (filed as part of U.S. Provisional Application 62/958,190, and incorporated herein by reference in its entirety) illustrate various features of embodiments of this invention. In embodiments of this invention, a garment is designed to place an array of sensors that are extremely sensitive on the body in accurate locations. This sensor array can be built on a stretch wire harness that is sewn into the garment. Each sensor node ("sensor") may include one or more of an accelerometer, a gyroscope, and/or a magnetometer. The array of sensors can include two or more sensors positioned on the garment to be aligned along a portion of a person's body. For example, in some embodiments such a garment may have 2 sensors, 3 sensors, 4 sensors, 5 sensors, 6 sensors, 7 sensors, 8 sensors, 9 sensors, 10 sensors, 11 sensors, 12 sensors, 13 sensors, 14 sensors, 15 sensors, 16 sensors, 17 sensors, 18 sensors, 19 sensors, or 20 sensors. In some embodiments, such a garment may have more than 20 sensors. In some embodiments, the sensors are aligned symmetrically on the garment. For example, the sensors may be positioned on a garment such that they are, when the garment is worn by a person, aligned along both feet of the person, and/or along both shins of the person, and/or aligned along both femurs of the person, and/or aligned along one or more portions of a person's hip or back. In another example, the sensors may be positioned on a garment such that they are, when the garment is worn by a person, aligned along portions of a wearer's upper body, for example, one or more of a hand, a forearm, an upper arm (e.g., that includes the bicep), the neck, one or more portions of the spine, and/one or more portions of the back.

One example of such a garment are "tights" worn on the lower body with foot stirrups. The sensors are located on the garment in seven locations along with a connector and mount for a removable Hub to be connected to the tights to transmit the data to a device for processing and access to real-time information and data. In other embodiments, additional sensors or fewer sensors may be used. The sensors are positioned on the harness and symmetrically on the garment along either of the legs of the tights and the foot stirrups of the tights. The harness is designed as a pattern piece that is sewn into the tights during manufacturing. The sensors are nodes on the harness that use the stretch wire system of the stretch wire harness for power as well as data transmission to the hub. For ease of reference, the term "tights" used herein generally is used to refer to tights that are configured with a hub and sensors coupled to a harness. Other garments that are configured with a hub and sensors coupled to a harness are also contemplated. For example, a shirt can be designed to have sensors aligned with portions of a wearer's upper body, for example, one or more of a hand, a forearm, an upper arm (e.g., that includes the bicep), the neck, one or more portions of the spine, and/one or more portions of the back.

FIG. 1 is a diagram illustrating an overview of an example of the invention. In the example of FIG. 1, only the left side of the tights are shown, however, the right side of the tights looks similar to and is configured similar to the left side that is illustrated. In this example, a sensor harness is included in a seam of tights, the sensor harness running along the stirrup of one leg of the tights along the shin portion of the tights and curving back along the femur portion of the tights. At an upper portion of the tights, the harness curves around the back of the tights and then correspondingly down the other leg. The harness includes wires that are coupled to a foot sensor, a shin sensor, and a femur sensor on each of the legs of the tights, a back sensor, and a hub. Although the hub in FIG. 1 is illustrated as being above the back sensor on the back of the tights, in other examples the hub can be positioned anywhere along the harness where it least obstructs the wearer for the activity involved. For example, the hub may be positioned along a portion of the tights that is on a portion of the tights that is on either hip of the wearer, along a portion of the lower back of the wearer, or any other portion of the tights where it can be connected to the harness.

Foot sensors are coupled to the harness and positioned on a portion of the tights that when worn, aligns the foot sensors with the top of the wearer's feet. The shin sensors are coupled to the harness and are positioned on a portion of the tights that when worn aligns the shin sensors along a portion of the shins of the wearer, for example, in parallel with and adjacent to a portion of a shin bone (e.g., the tibia or the fibula) of the wearer. The femur sensors are coupled to the harness and are positioned on a portion of the tights that when the tights are worn aligns the femur sensors along the femurs of the wearer, for example, in parallel with an adjacent to the femurs of the wearer. The back sensor is coupled to the harness and positioned on the tights such that it is on a low portion of the back of the wearer of the tights, for example, along the sacrum of the wearer. In some implementations, the calibration process can be run once the tights are on the wearer to take into account any misalignment of the foot, shin, femur and back sensors with the respective portions of the wearer's body.

The hub may be configured to wirelessly communicate information collected by the sensors, via a network, to a base station (or control device) that includes at least one computer hardware processor and may include a display device. The base station is configured to store and process information collected from the sensors, and generate and display information related to the position and/or movement of the wearer's feet, shins, femurs, and back (e.g., the legs or lower portion of the wearer). The hub may also be configured to be removable from the tights and be coupled to the base station through a docking port. Use of the docking port may allow information from the hub to be transferred to the base station in a higher transfer rate in addition, a docking station that has multiple docking ports allows the transfer of information from multiple hubs for multiple wearers simultaneously (or nearly simultaneously).

In some embodiments, information communicated from the hub to the control device may be processed and resulting information displayed in real-time, or near real-time. This allows a trainer to monitor and provide real-time feedback to the wearer of the tights while they are performing and athletic activity (for example, running, cycling, physical therapy, weightlifting, yoga, gymnastics, fencing, boxing, and the like). Although the hub is electrically coupled to the harness, in some embodiments the hub may be removably coupled to the harness. In such embodiments, when the hub is coupled to the harness, the hub can collect and store data from the feet, shin, femur, and back sensors. Then, the hub may be removed from the harness and electrically coupled to the control device, for example, via a docking station having one or more docking ports, and the data stored in the hub may be transferred to the control device and processed and/or displayed. Implementations with the hub can be removed from the harness and coupled to the base station can be useful when multiple users are wearing implementations of the garment with motion capture sensors for an activity that ends at roughly the same time (e.g., a group physical therapy session or a group training session), and in such cases, the user can remove their individual hubs and coupled them to the base station using a docking station that can accept multiple hubs so that all of the user's data can be downloaded to the control device process and stored.

Because the base station does not have the same size constraints as the hub (e.g., in order for the hub to be reasonably worn during a physical activity) the base station includes more processing power and more storage capability than the hub. While some initial processing may be done by a hardware processor in the hub, generally more processing of the collected data is performed by the base station including rendering information collected by the hub to portray on a display of the base station. In various embodiments, the base station may include multiple hub slots for offline data download and charging and Bluetooth connections to multiple hubs for real-time data streaming or exercise pass/fail signaling. The base station may also include processing software that can perform all motion reconstruction related tasks including initial pose calibration, real time avatar reconstruction based on an anatomically correct model and all use case specific algorithms.

Some of the use cases that are contemplated include:
free form: based on sensor node quaternions, enables the calculation of real-time metrics and immediate avatar display;
post game markers: based on calibrated sensor data, independent of the ambient magnetic field but also tailored to specific movement patterns (i.e. it is not a generic motion reconstruction solution); and
activation: based on calibrated sensor data, exercise detection & assessment based on standard scoring systems (e.g., FMS)

Alternative structures/steps—this basic design strategy can be applied to many different garment types, including but not limited to: shirts, sleeves, knee covers, socks, hats, shoes, insoles, leggings, shorts, gloves. This basic strategy may also be applied to different kinds of product: helmets, protective clothing, protective equipment, safety equipment, braces for human limbs, exoskeletons, etc.

Some of the unique features for these designs include placement of the sensors. For example, the sensor placement on the foot ("foot sensor") within the stirrup, the sensor placement on the upper thigh near top of the femur at the hip joint ("femur sensor"), the sensor placement on the anterior of the shin bone ("shin sensor"), and the sensor placed on the lower back at the end of the spine ("back sensor"). The foot sensor is aligned with the wearer's foot and provides an indication of the position or motion of the wearer's foot. The foot sensor can be a line between the 2nd and 3rd metatarsal bones of the foot (see for example attachment 3). The femur sensor is aligned with the wearer's femur and provides an indication the position or motion of the wearer's femur. The femur sensor can be aligned along the femur at a distance of about 40% between the edge of the hip in the knee joint closer to the edge of the hip (see for example attachment 3). The shin sensor is aligned with the wearer's shin and provides an indication of the position or the motion of the wearer's shin. The shin sensor can be aligned with the wearer's shin and positioned in approximate 25% of the distance from the knee joint on the shin bone to the ankle, closer to the knee joint (see for example attachment 3). The back sensor is aligned that it lies between the posterior superior iliac spines on the pelvis and on the upper part of the sacrum surface (or close to the sacrum). The particular position of the sensor can be crucial such that the sensor is aligned with the adjacent bone structure with as little muscle, fat, tissue between the sensor and the adjacent bone structure.

In the position of the seven sensors described above, the ankle is between the foot sensor in the shin sensor, the knee joint is between the shin sensor in the femur sensor, and the hip is between the femur sensor in the back sensor. The positioning of the foot sensor allows the angle and position of the foot to be determined relative to the angle and position of the shin, and the angle and position of the femur, and the angle and position of the lower back. The positioning of the shin sensor allows the angle and position of the shin to be determined relative to the angle and position of the foot, the angle and position of the femur, and the angle and position of the lower back. The positioning of the femur sensor allows the angle position of the femur to be determined relative to the angle and position of the foot, the angle and position of the shin, and the angle position of the lower back. The positioning of the back sensor allows the angle and position of the lower back of the wearer of the tights to be determined relative to the angle position of the foot, the angle and position of the shin, and the angle position of the femur.

The form analysis system described herein is 'marker-less' and 'reference-less', implying that there are no identification markers on the garment which is used to understand its position or displacement in free space against a known reference point(s). For example, a motion capture suit with reflective markers all over the suit can be used with a system of infrared cameras to digitally capture the user's movements in a fixed location. This is often seen in Hollywood-grade animation and visual effects studios.

The system is a means to improve the accuracy of a marker-based system by a novel 'gap-filler' algorithm that fills-in missing data on a marker-based system due to problems associated with occlusion and other errors found in such systems.

Figure 2:
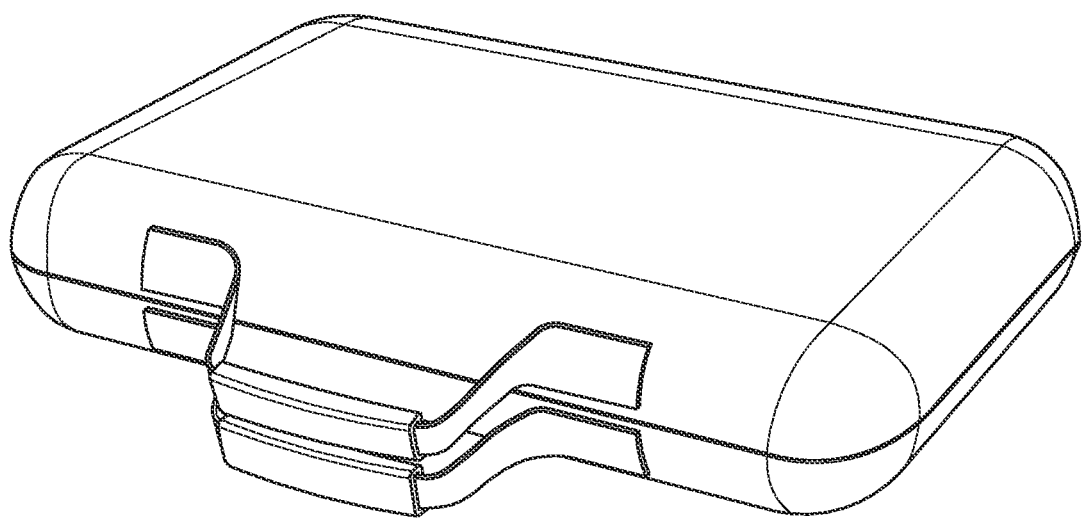
FIGS. 2-11 are images illustrating various aspects of features of embodiments of the invention.
Figure 3:
Figure 4:
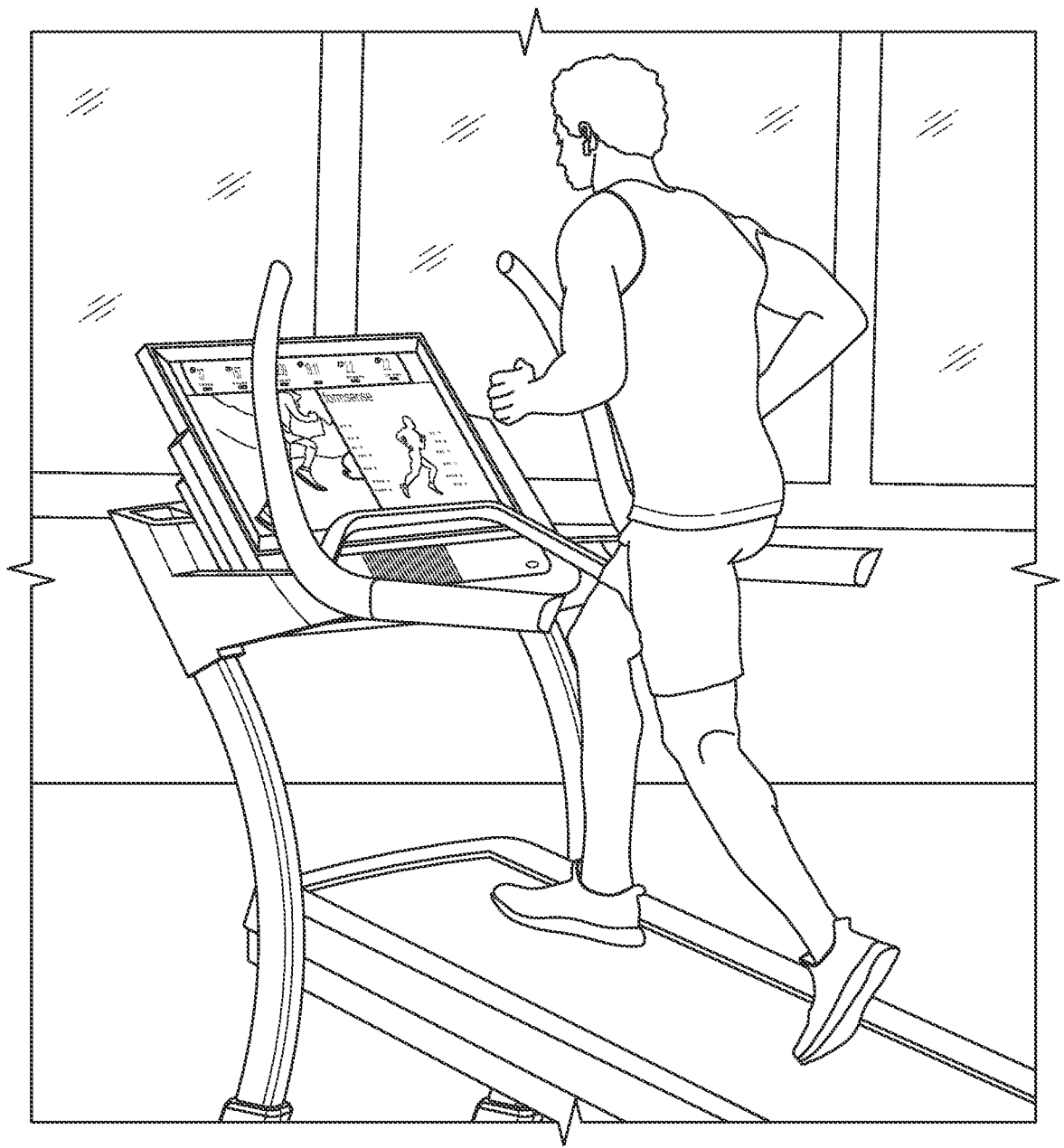
Figure 5:
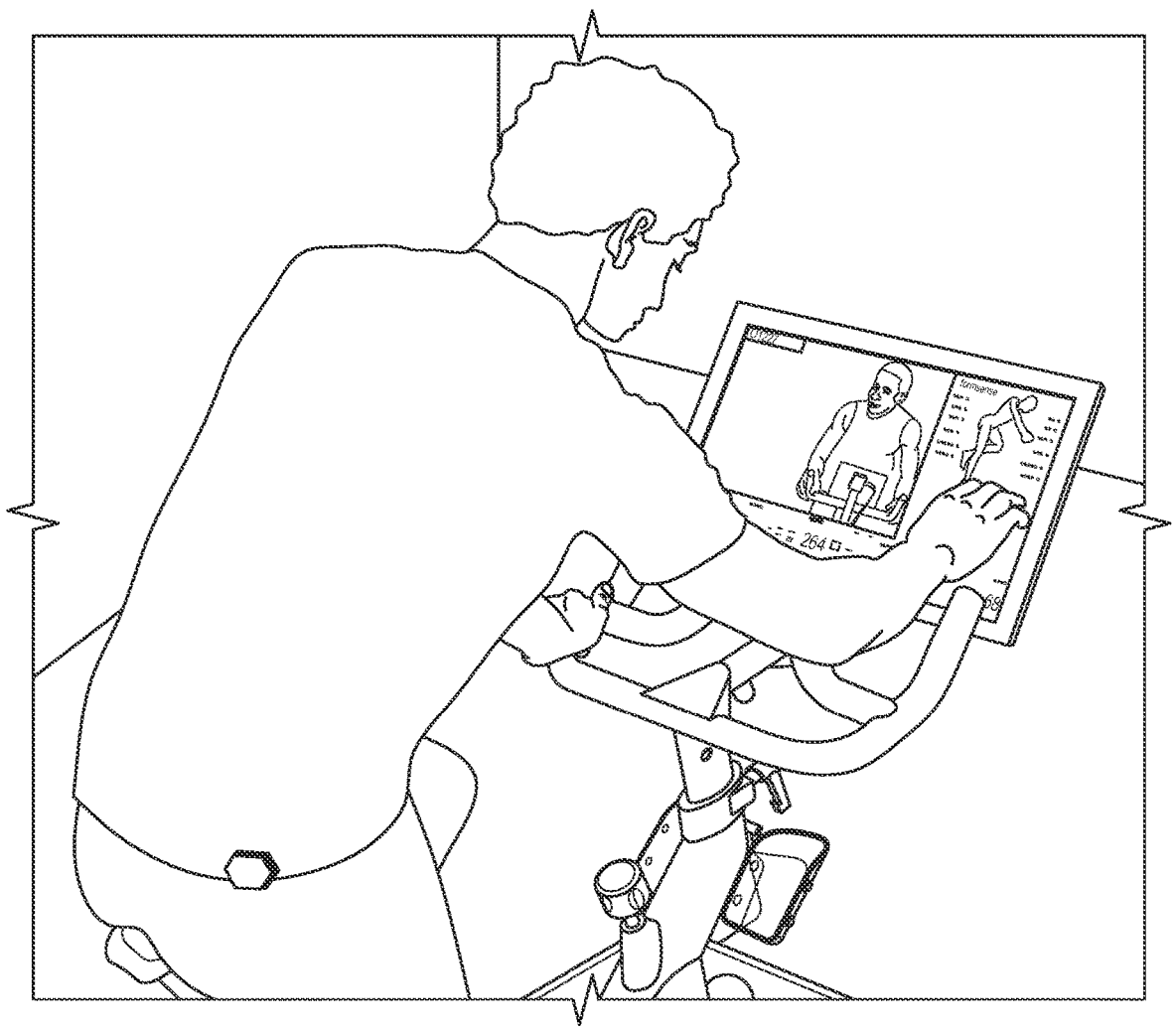
Figure 6:
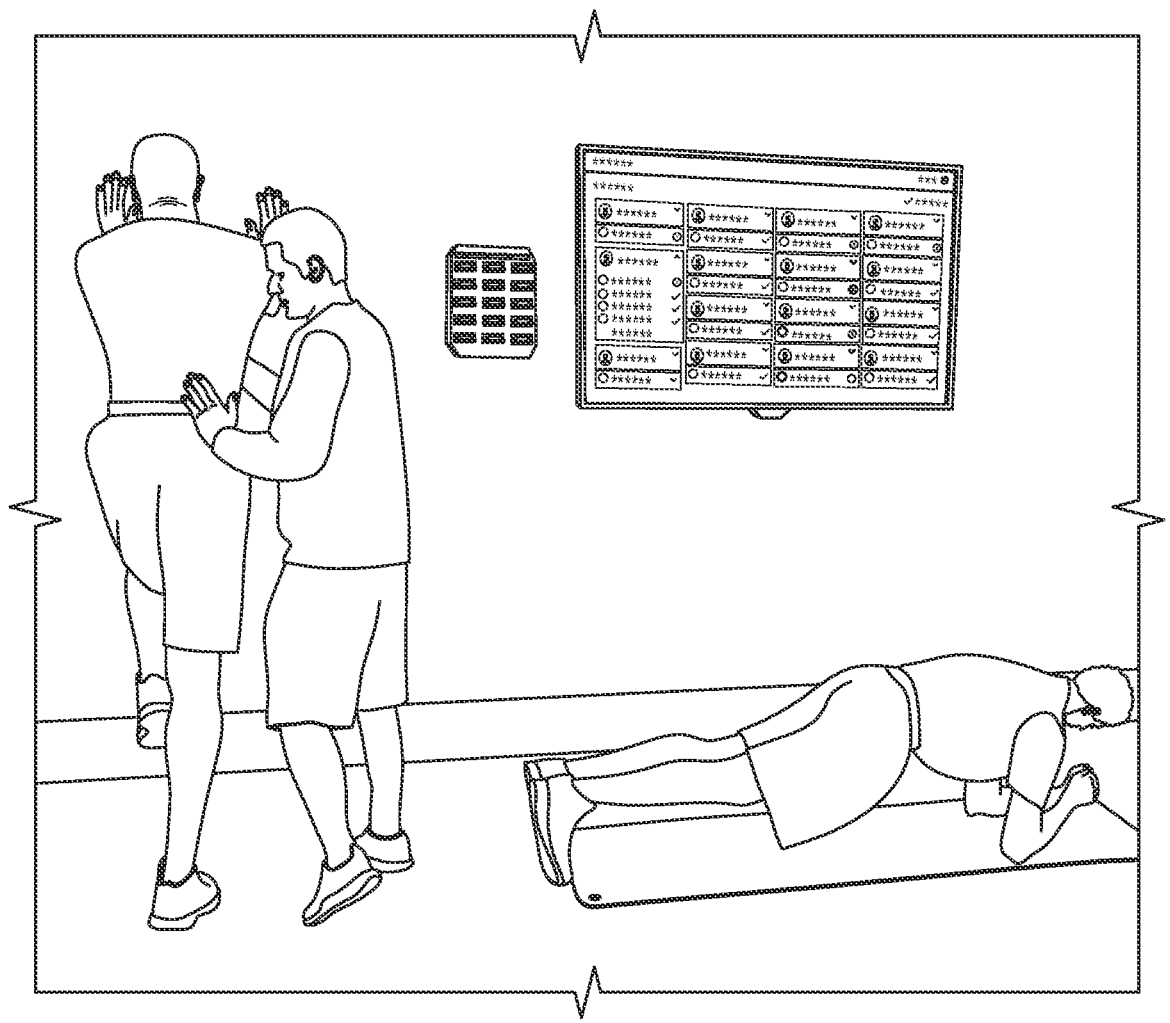
Figure 7:
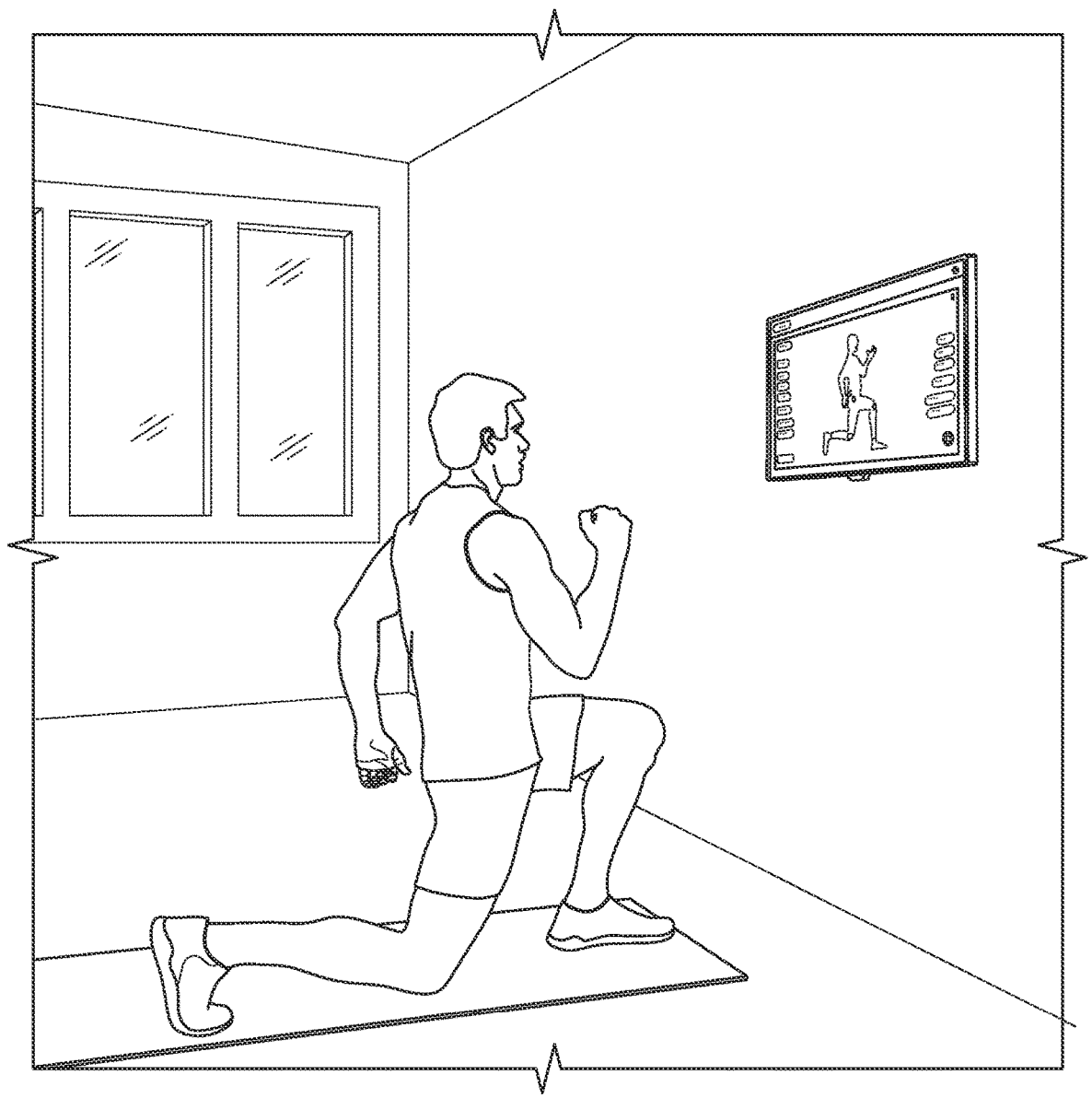
Figure 8:
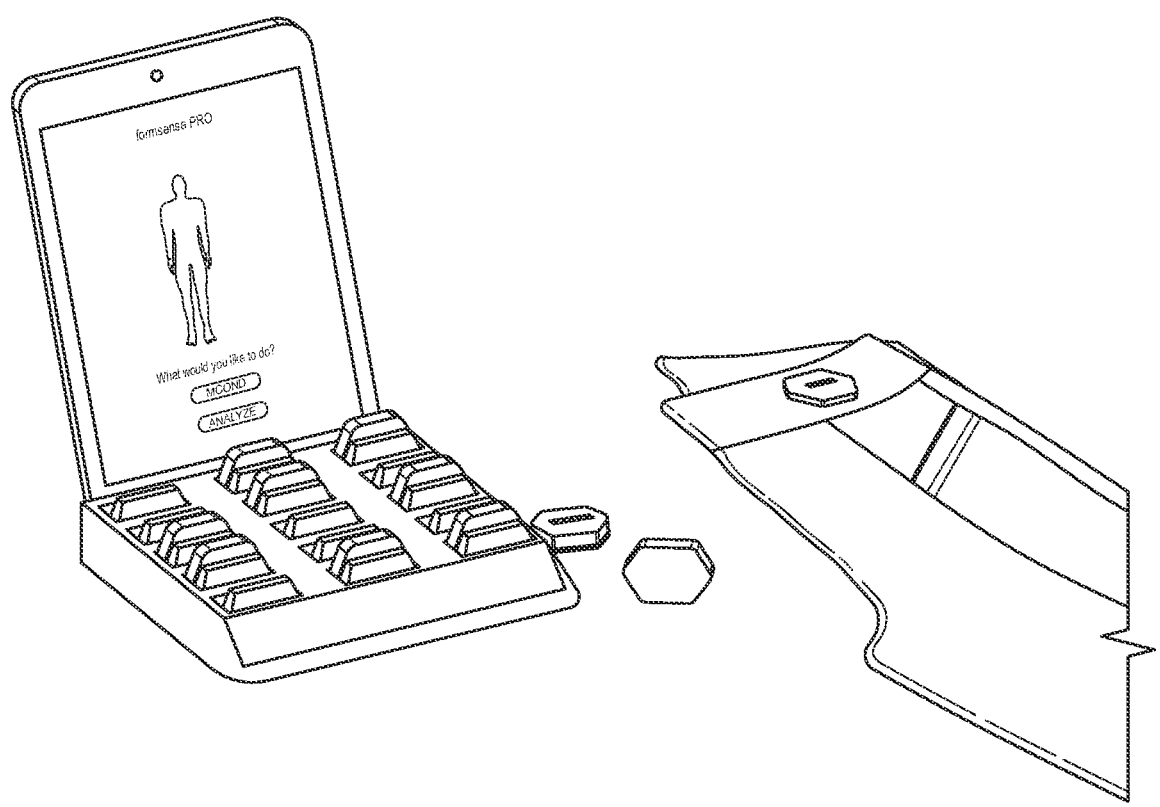
Figure 9:
Figure 10:
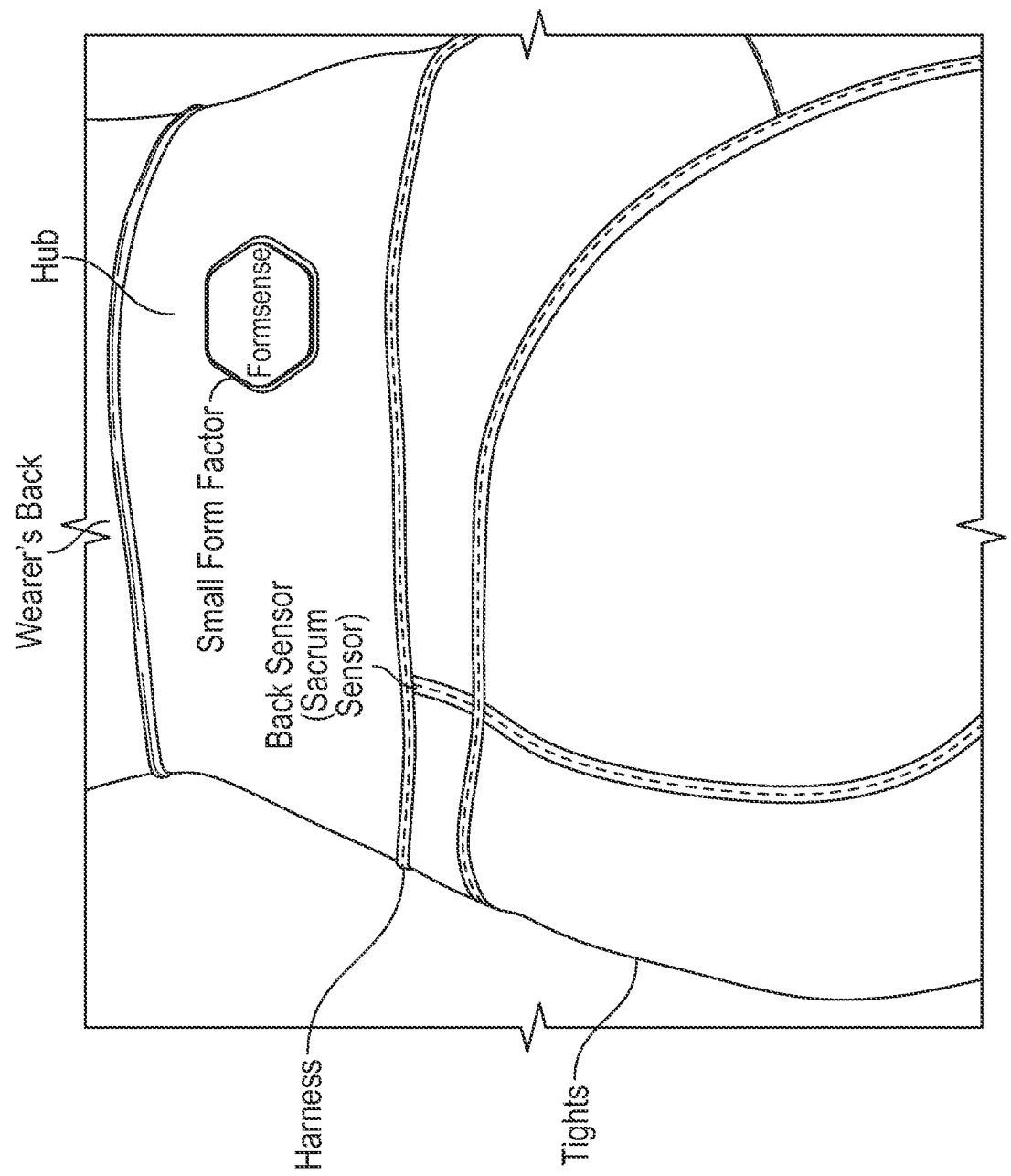
Figure 11:
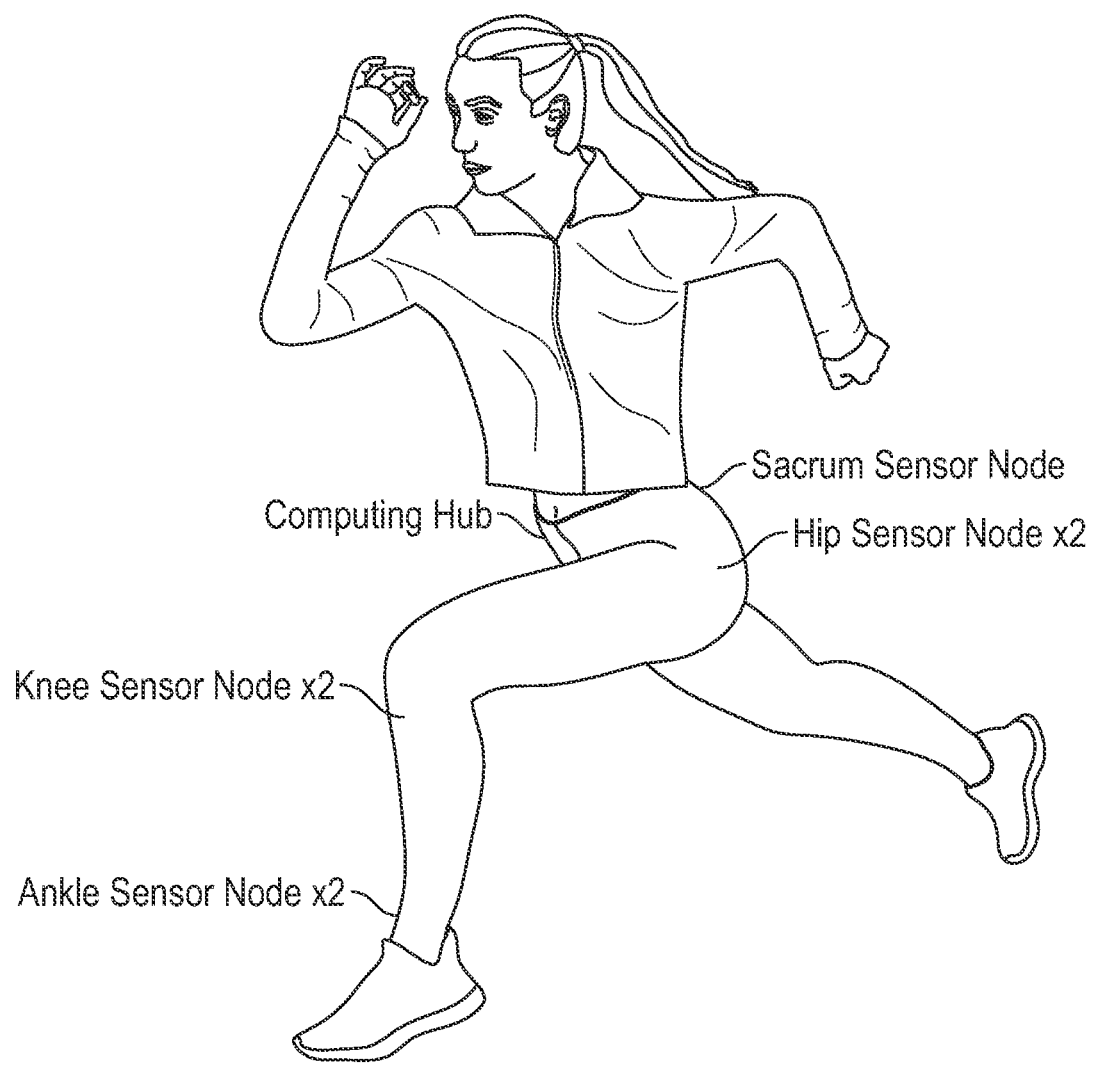

FIGS. 2-11 are images illustrating various aspects of features of embodiments of the invention. FIG. 2 illustrates an example of a case that can house a docking station and the base station illustrated in FIG. 1, illustrating his portability. FIG. 3 shows the inside of the case shown in FIG. 2. FIG. 4 illustrates an example of the tights/sensors shown in FIG. 1 on a wearer engaged in a running activity. FIG. 5 illustrates an example of the tights/sensors shown in FIG. 1 on a wearer engaged in a cycling activity. FIG. 6 illustrates an example of two people wearing embodiments of the tights described herein and a base station a display mounted on the wall that is receiving (wirelessly) information from one or more of the two people. FIG. 7 illustrates an embodiment where a person is wearing the tights and the hub on the tights is wirelessly communicating with a base station/display mounted on a wall which has been configured to allow the person to see their form in real-time. FIG. 8 illustrates a docking station, a display, and multiple hubs some of which are docked in the docking station. FIG. 9 illustrates the person wearing the tights in the hub of the tights is wirelessly communicating information to a nearby display such that the person wearing the tights and the trainer can view the information on the display in real time which can help adjust the person's form, for example, for physical therapy. FIG. 10 is a picture illustrating an upper backside portion of an example of the tights, showing the placement of the harness embedded in the tights, the placement of the back sensor, and the placement of the hub, according to some embodiments. FIG. 11 is a picture of a woman wearing the tights in the placement of the sensors on the tights, according to some embodiments.

Figure 12:
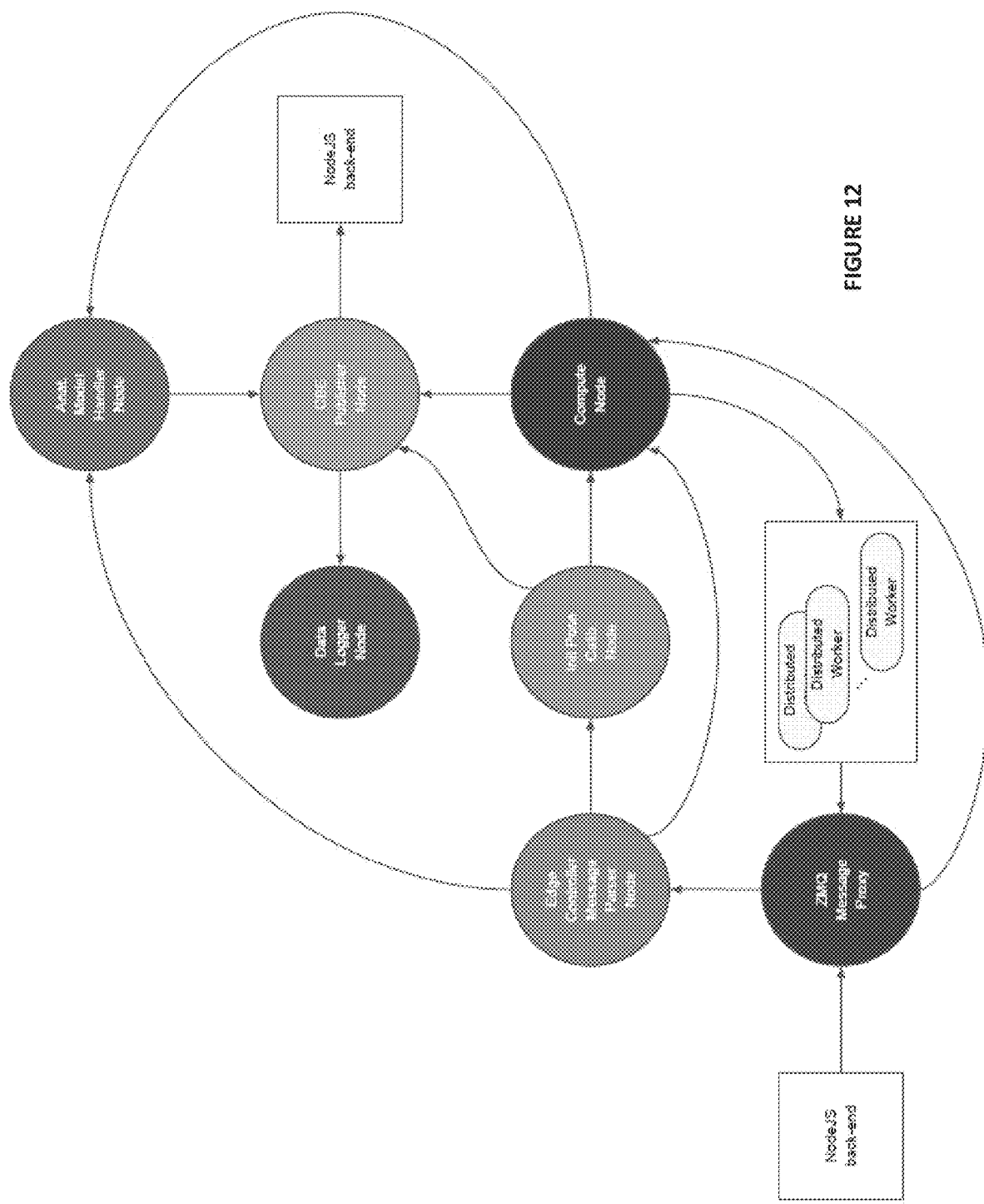
Figure 13:
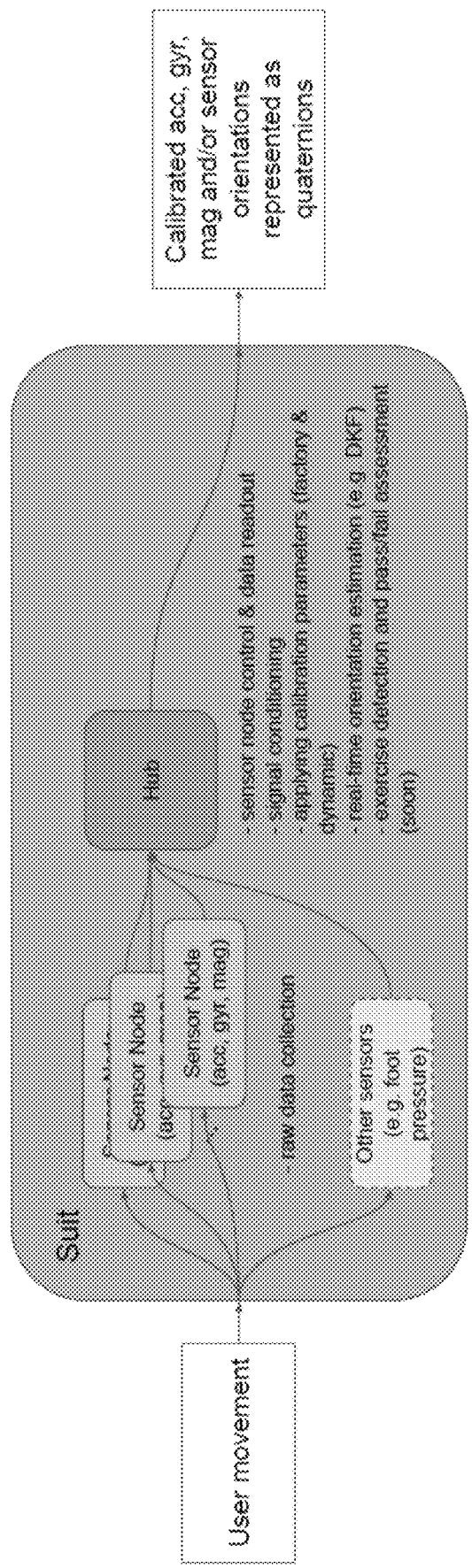

FIG. 12 illustrates an example of a computational backend flowchart for a system such as the one illustrated in FIG. 1.

Figure 14:
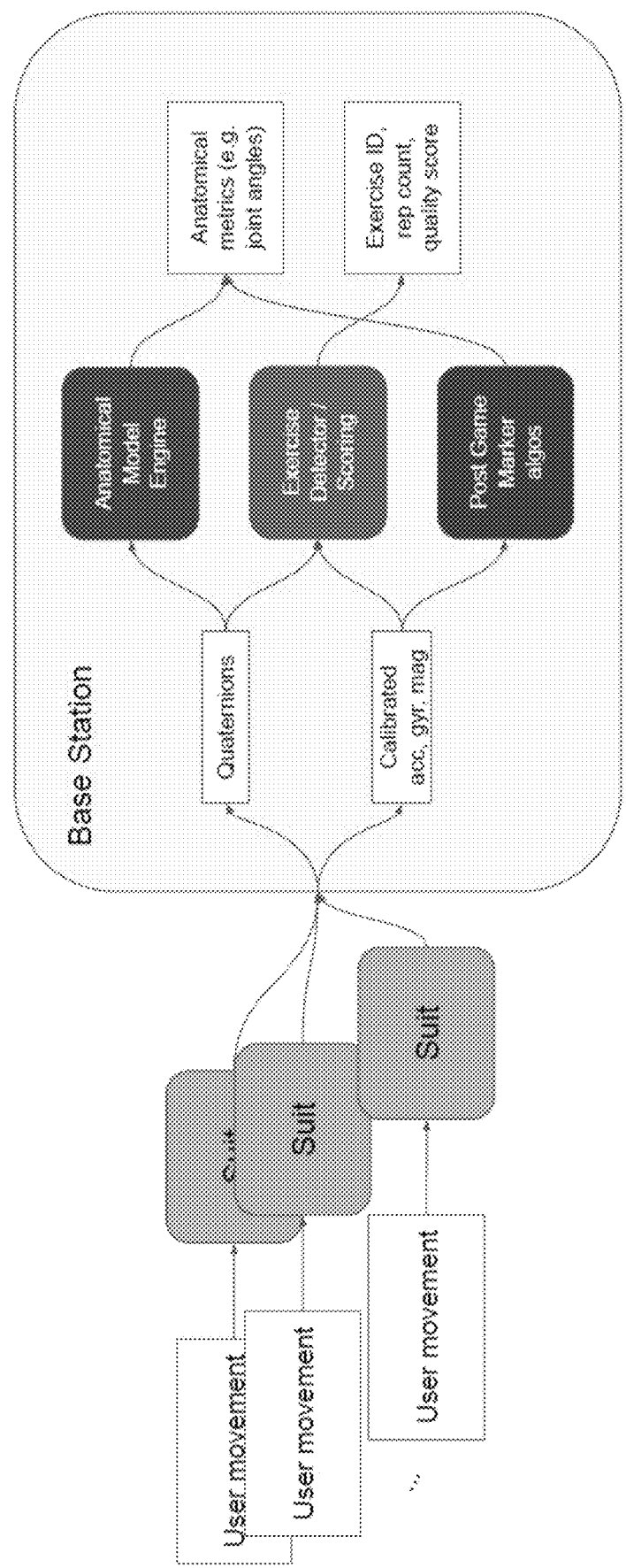

FIGS. 12-15 illustrate and describe examples of data flow and levels of motion analysis of embodiments of the invention. For example in FIG. 13, user movement of the wearer of the garment causes signals to be generated by one of more sensor nodes (for example, a foot sensor, a shin sensor, a femur sensor, and/or a back sensor). The signals from the sensor nodes I communicated to a hub. The hub may be configured to process the received information. For example, the hub may be configured to provide sensor node control and data readout information, signal conditioning, it may be configured to apply calibration parameters (e.g., factory and/or dynamic), may be configured to provide real-time orientation estimation, it may be configured to for exercise detection and pass/fail assessment. The hub may further configured to communicate calibrated accelerometer, gyroscope, magnetometer, and or sensor orientations to the base station. FIG. 14 illustrates examples of functionality of the base station. The functionality can include an anatomical model engine, and exercise detector/scoring functionality, and/or post game marker algorithms. From the information that the basis receives from the hub and using the functionality configured on the base station, the base station may generate data that can be stored, transferred to another system, or displayed. For example, the basis may generate anatomical metrics (e.g., joint angles), exercise ID, the petition count inequality score. FIG. 15 describes examples of further functionality of the base station.

Figure 16:
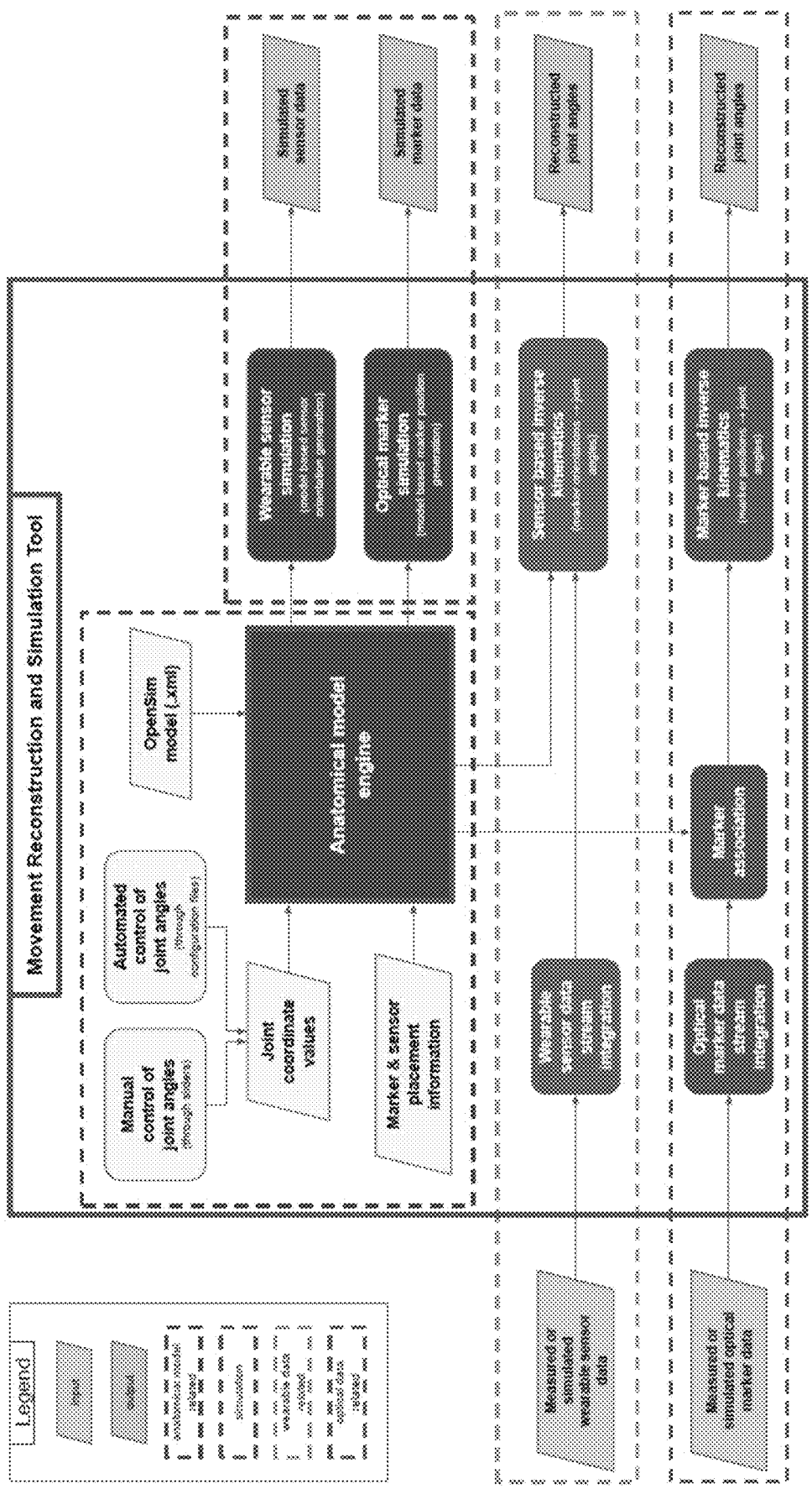
FIGS. 16 and 17 illustrate a movement reconstruction and stimulation block diagram.
Figure 17:
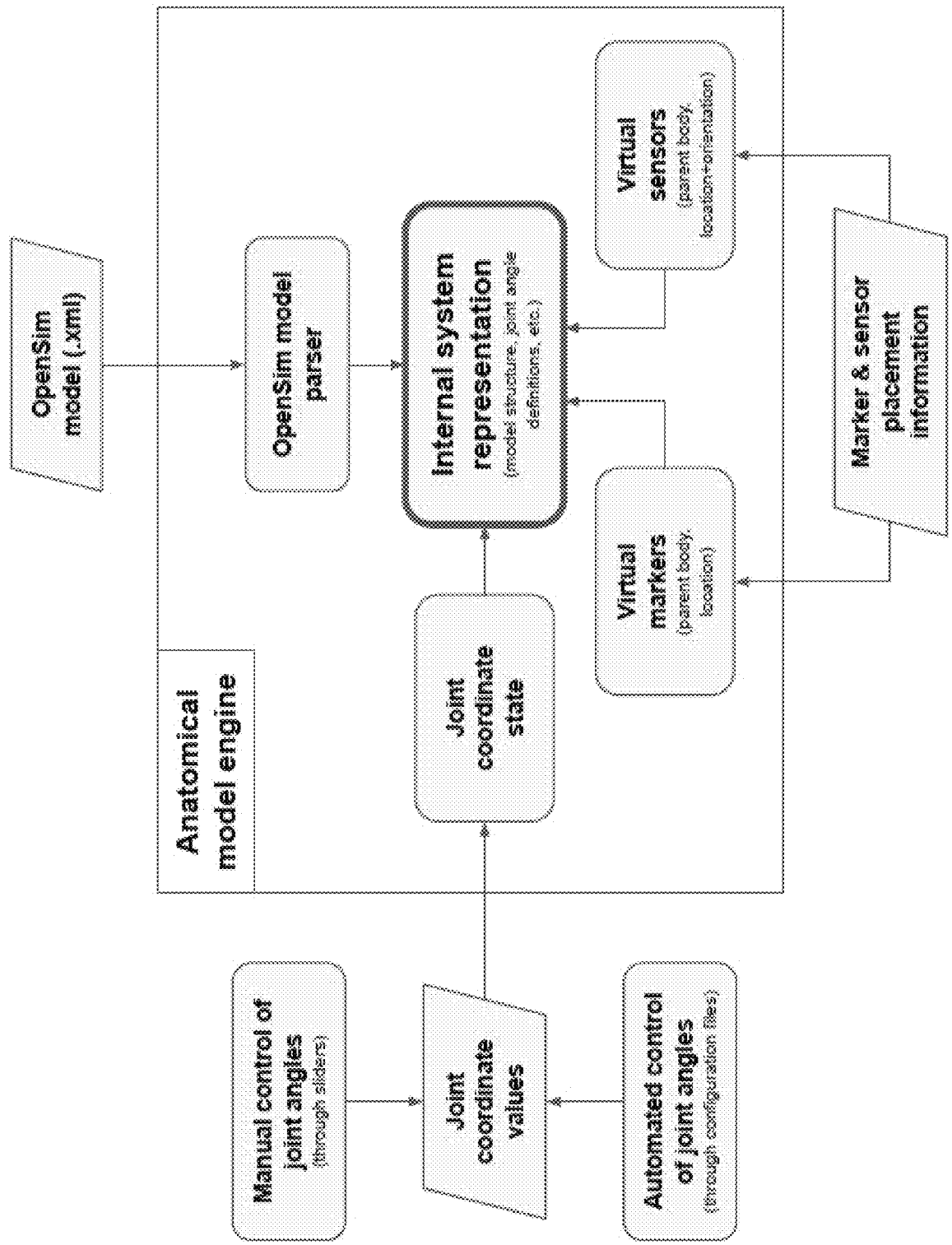
Figure 18A:
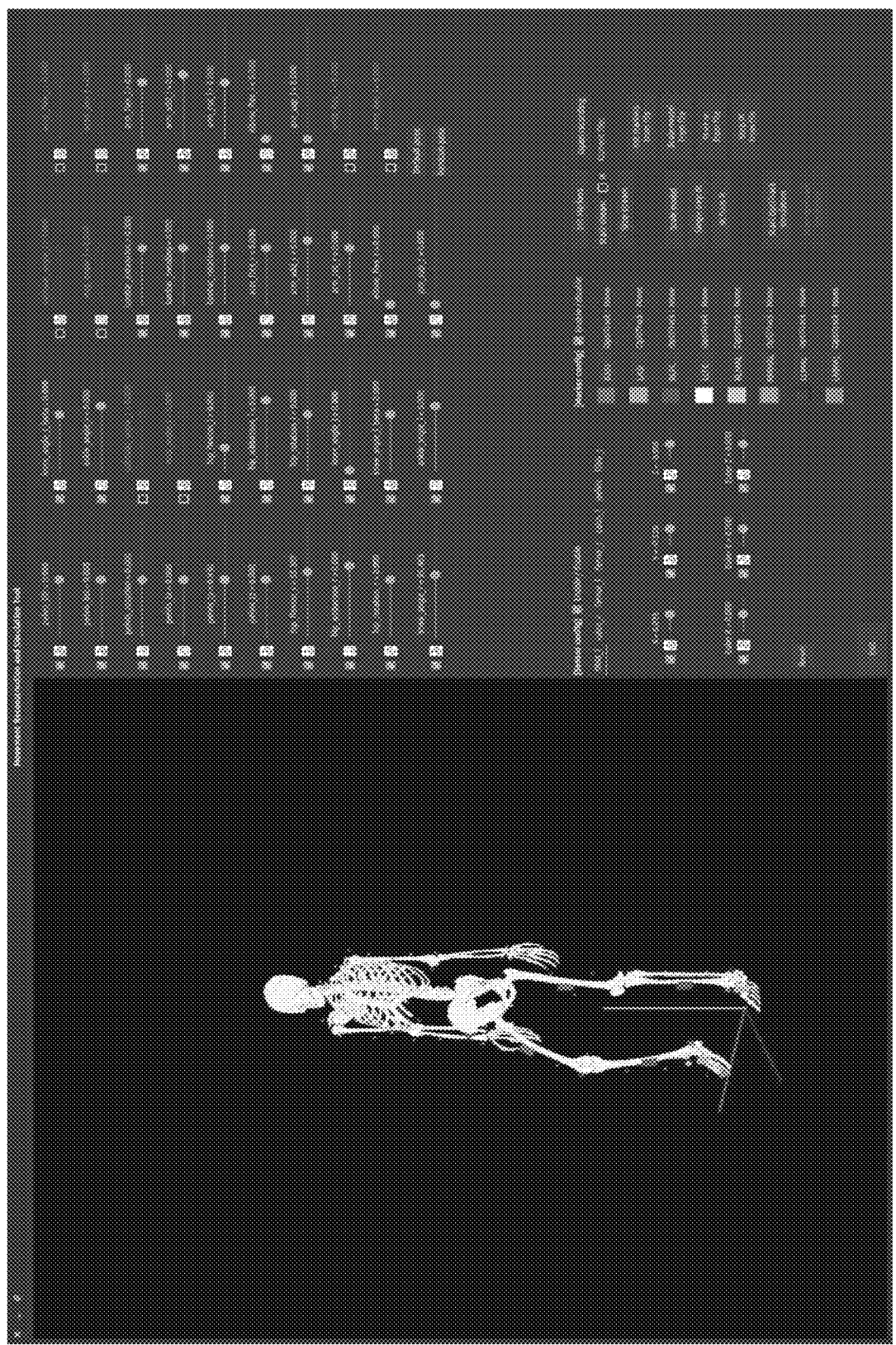
FIG. 18A-18D illustrate a graphical display that can be generate and displayed, for example, by the base station.
Figure 18B:
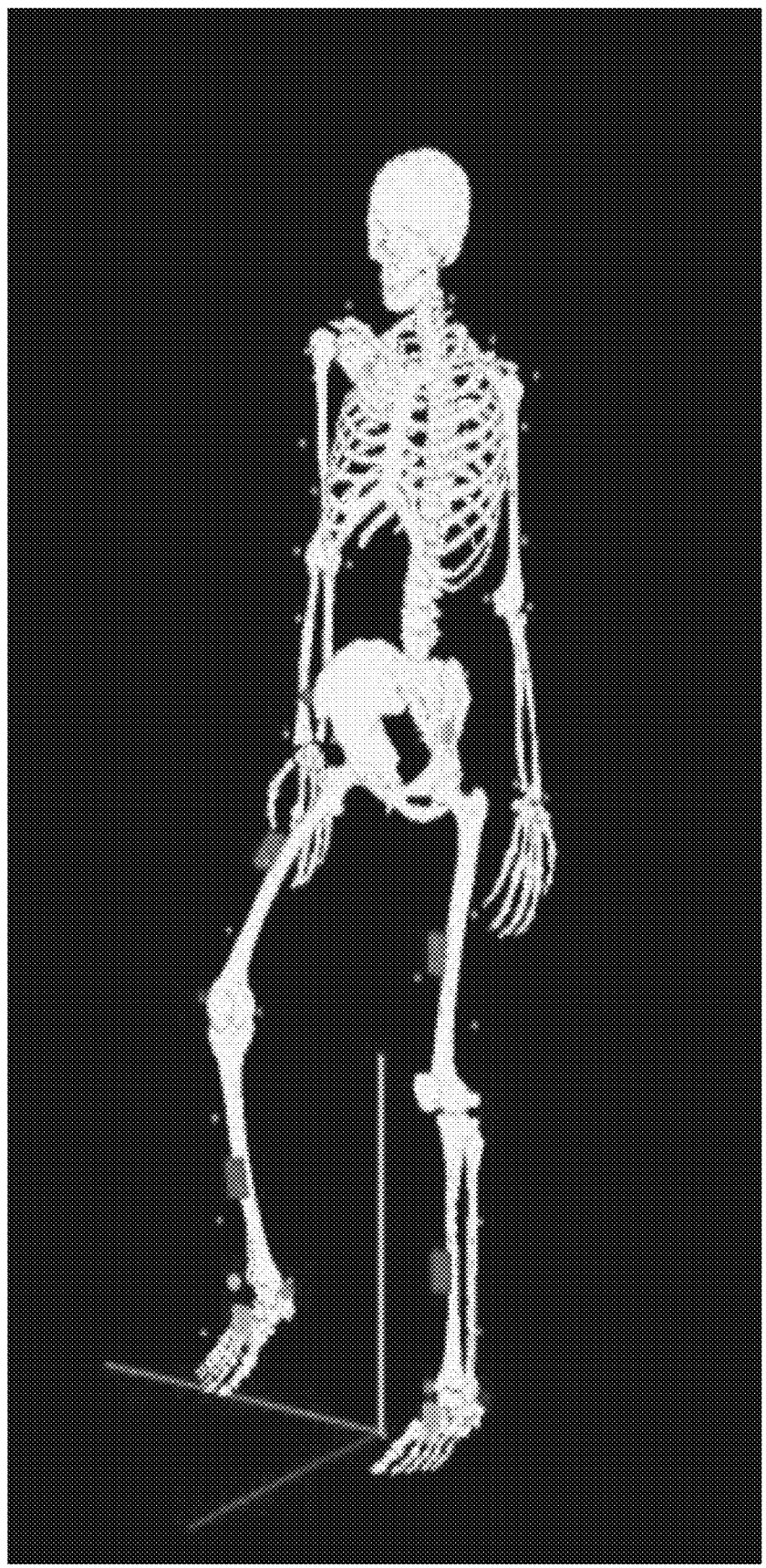
Figure 18C:
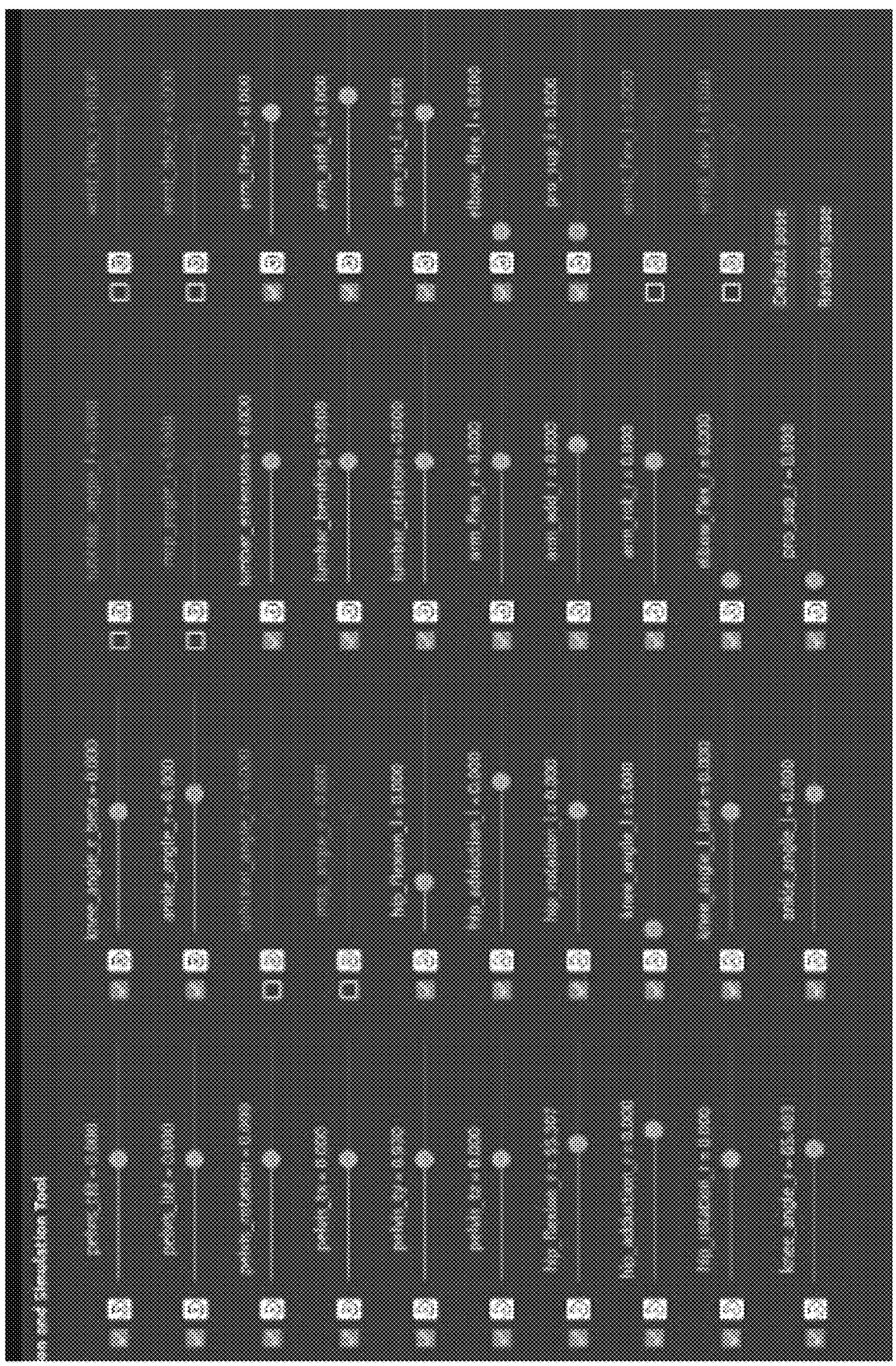
Figure 18D:
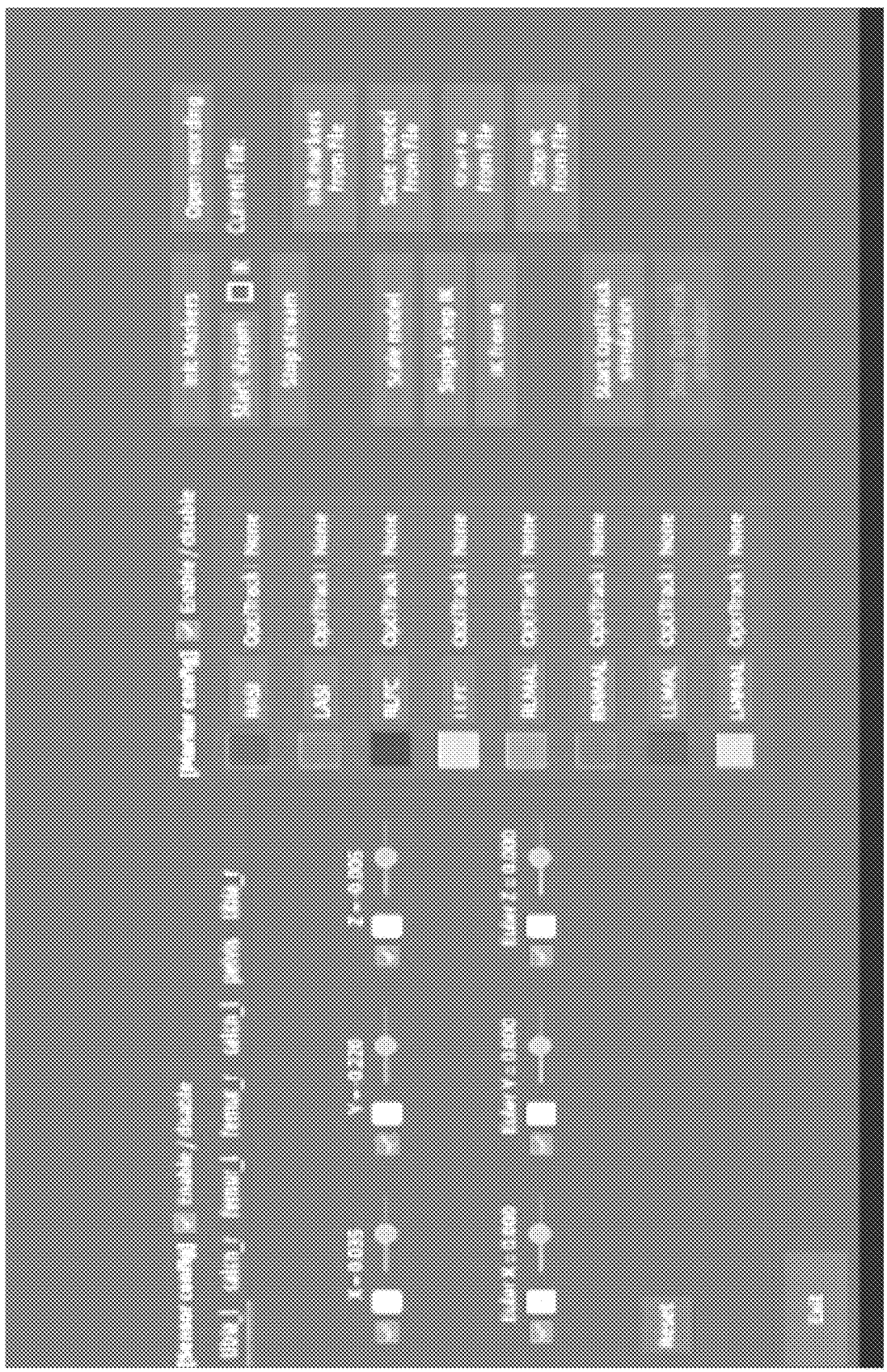
Figure 19:
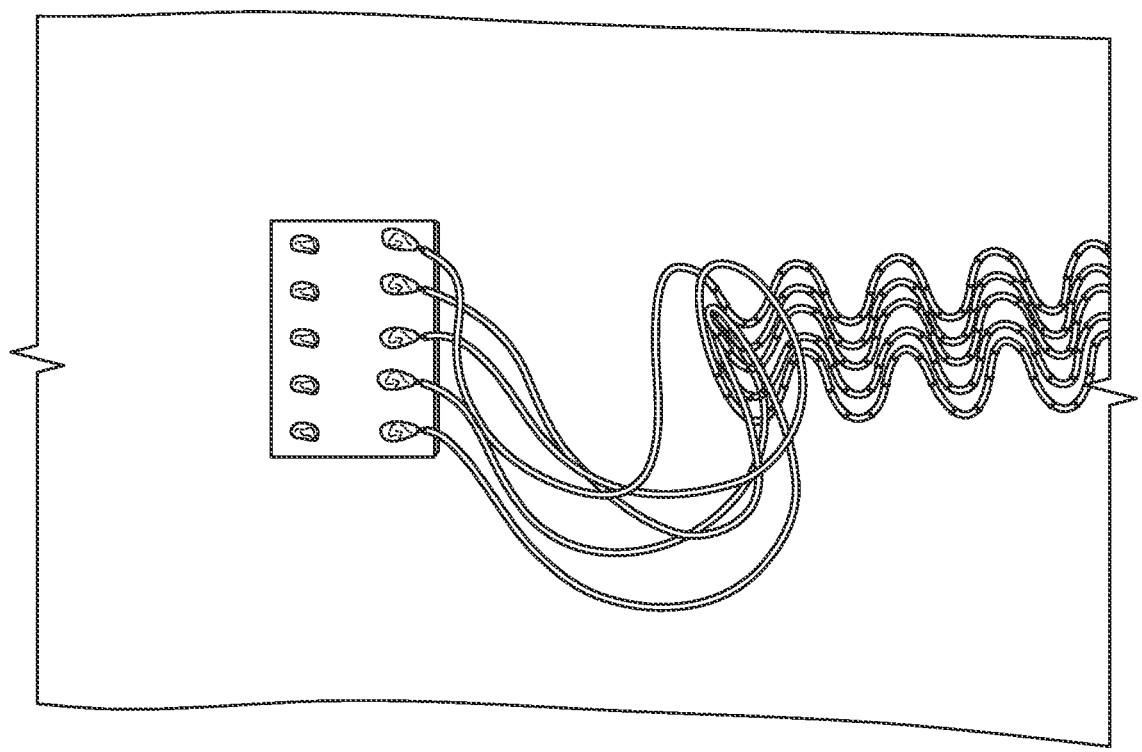
FIGS. 19-22 illustrate images of examples of the wiring harness.
Figure 20:
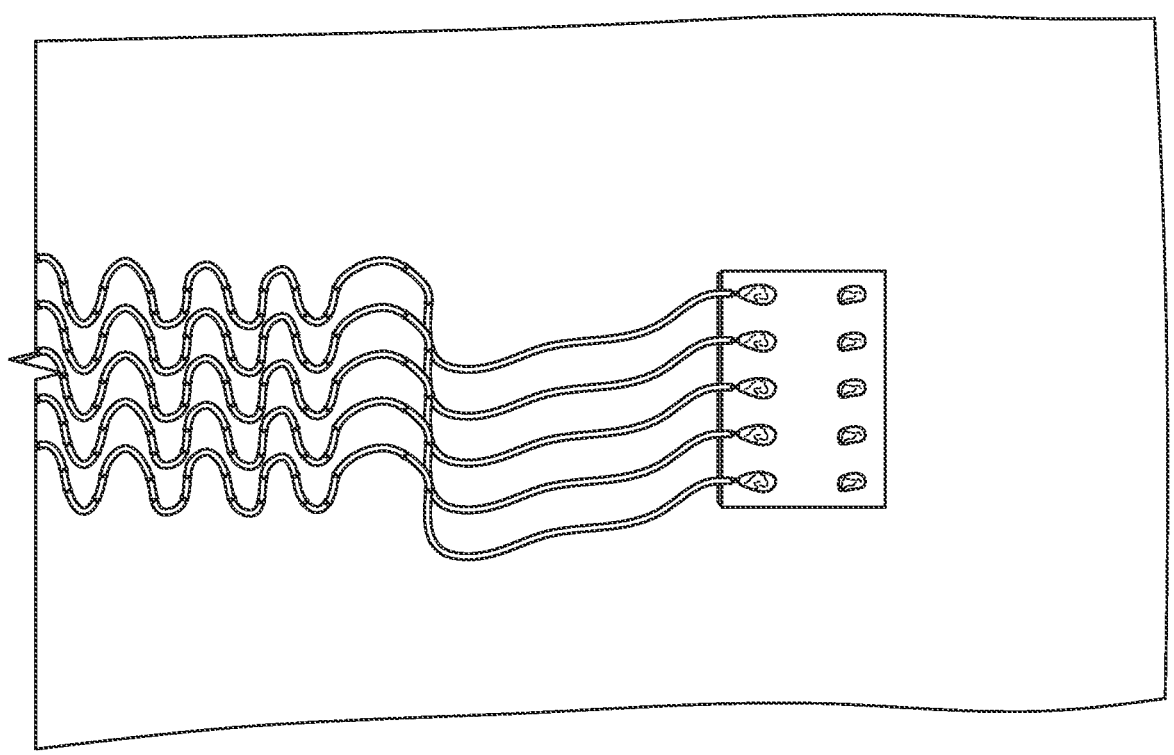
Figure 21:
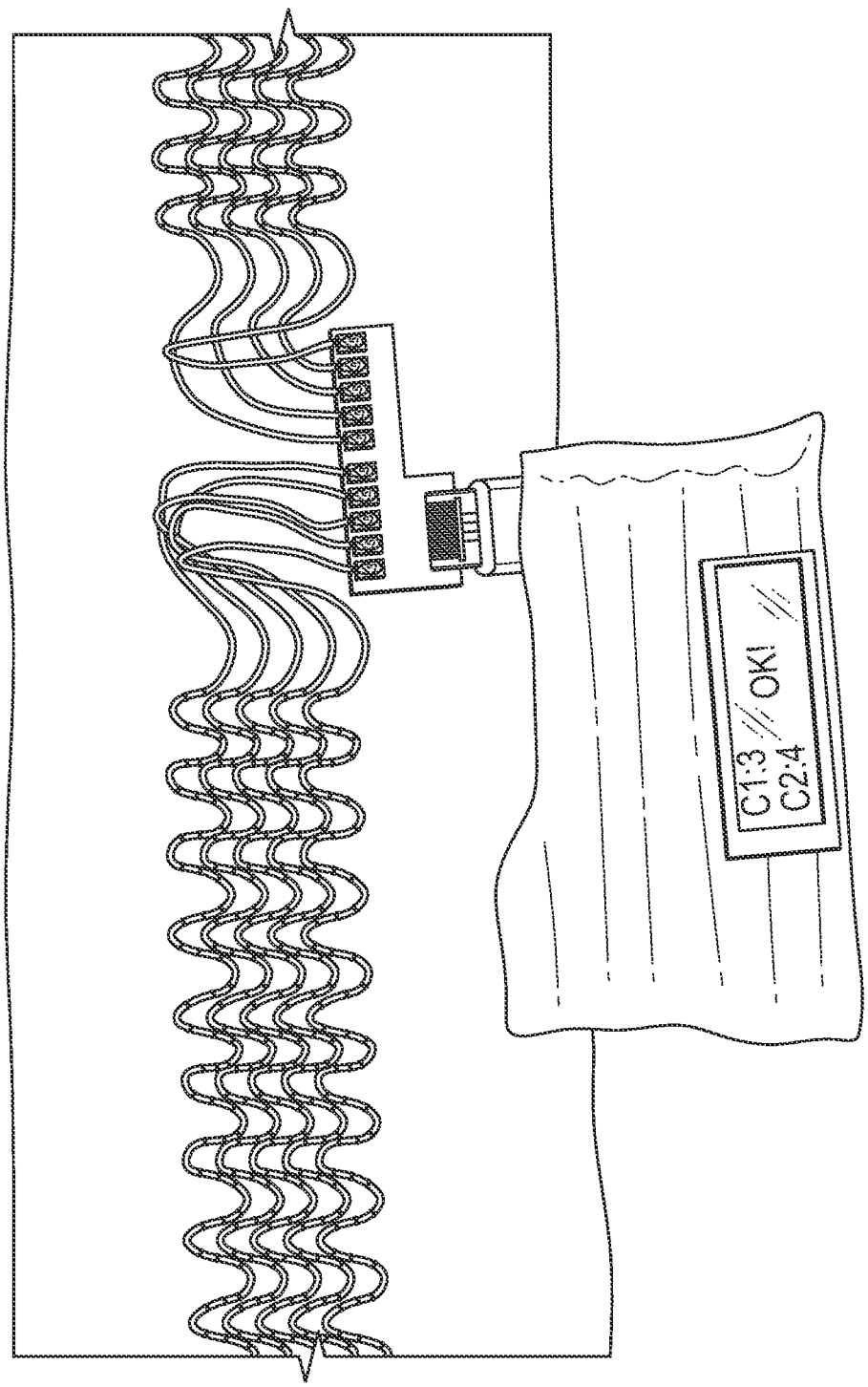
Figure 22:
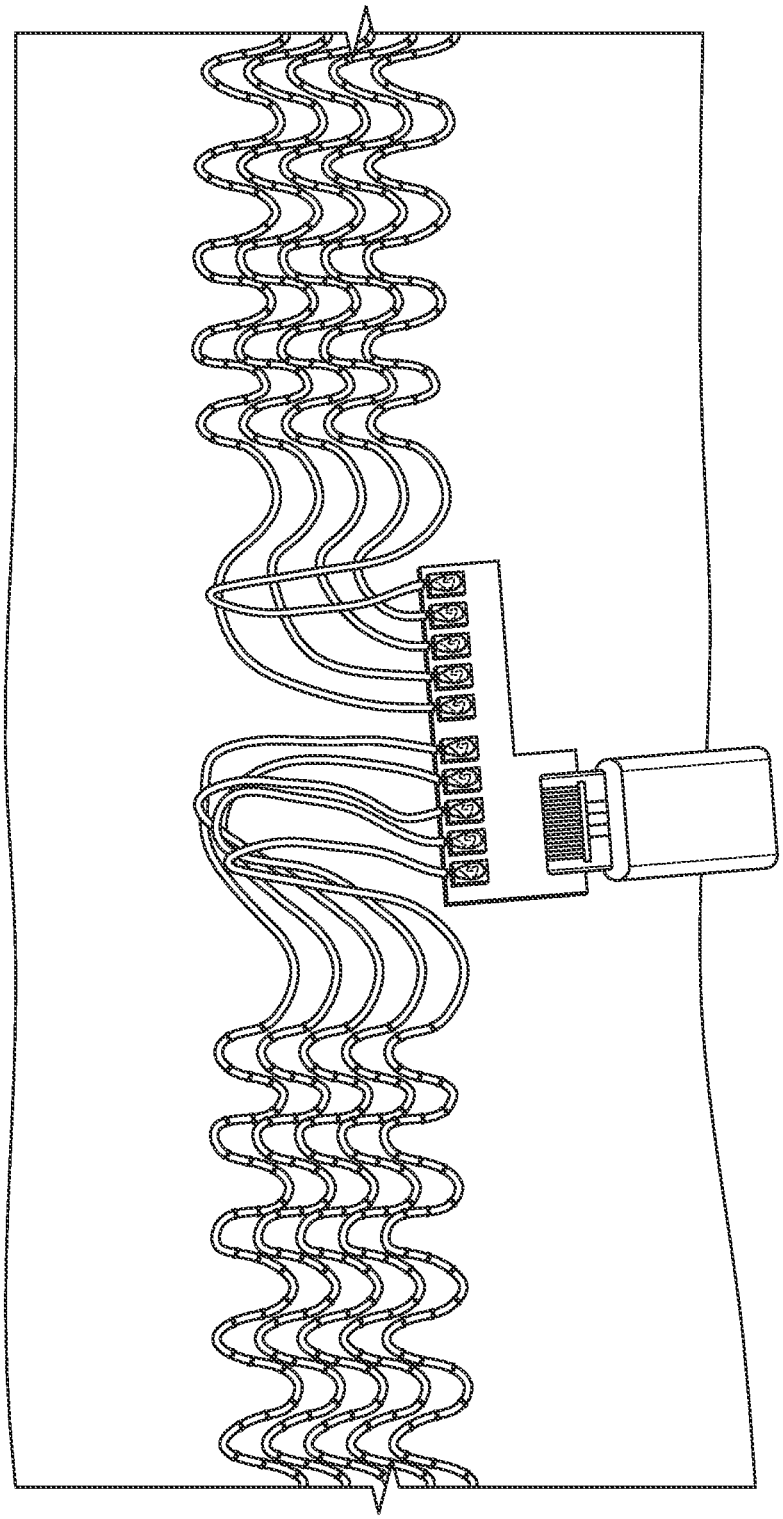
Figure 23:
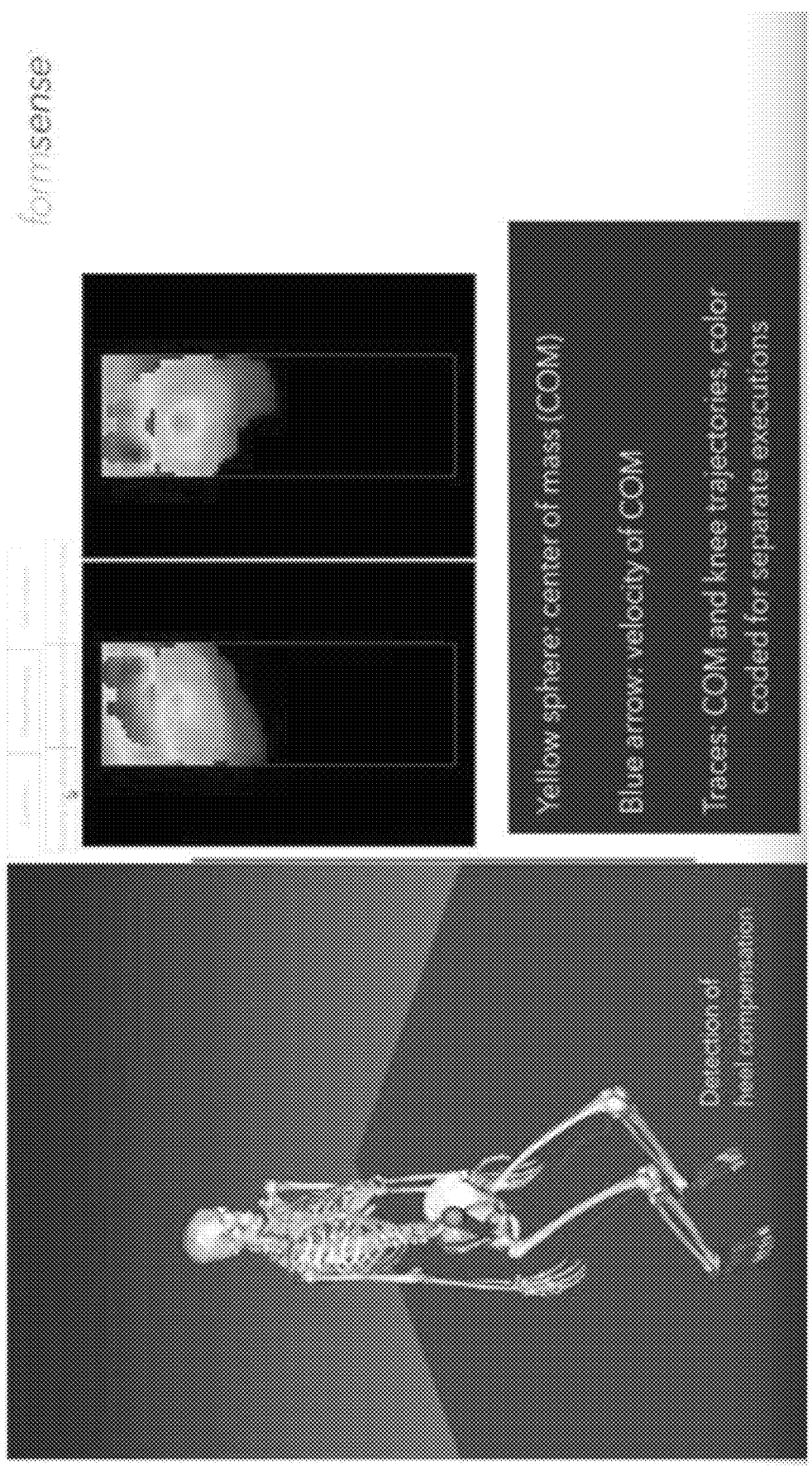
FIGS. 23-29 provide illustrate examples of anatomical point tracking.
Figure 24:
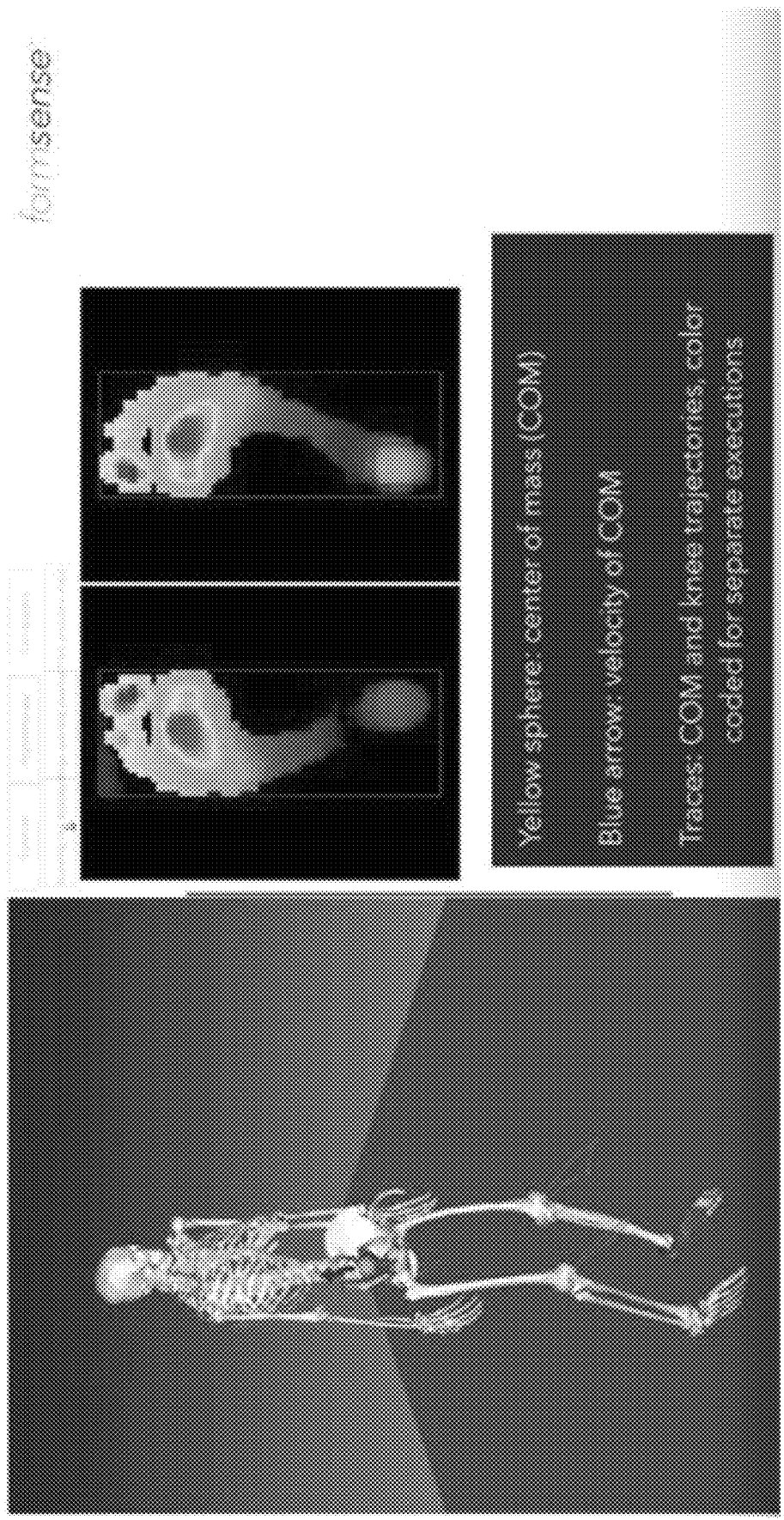
Figure 25:
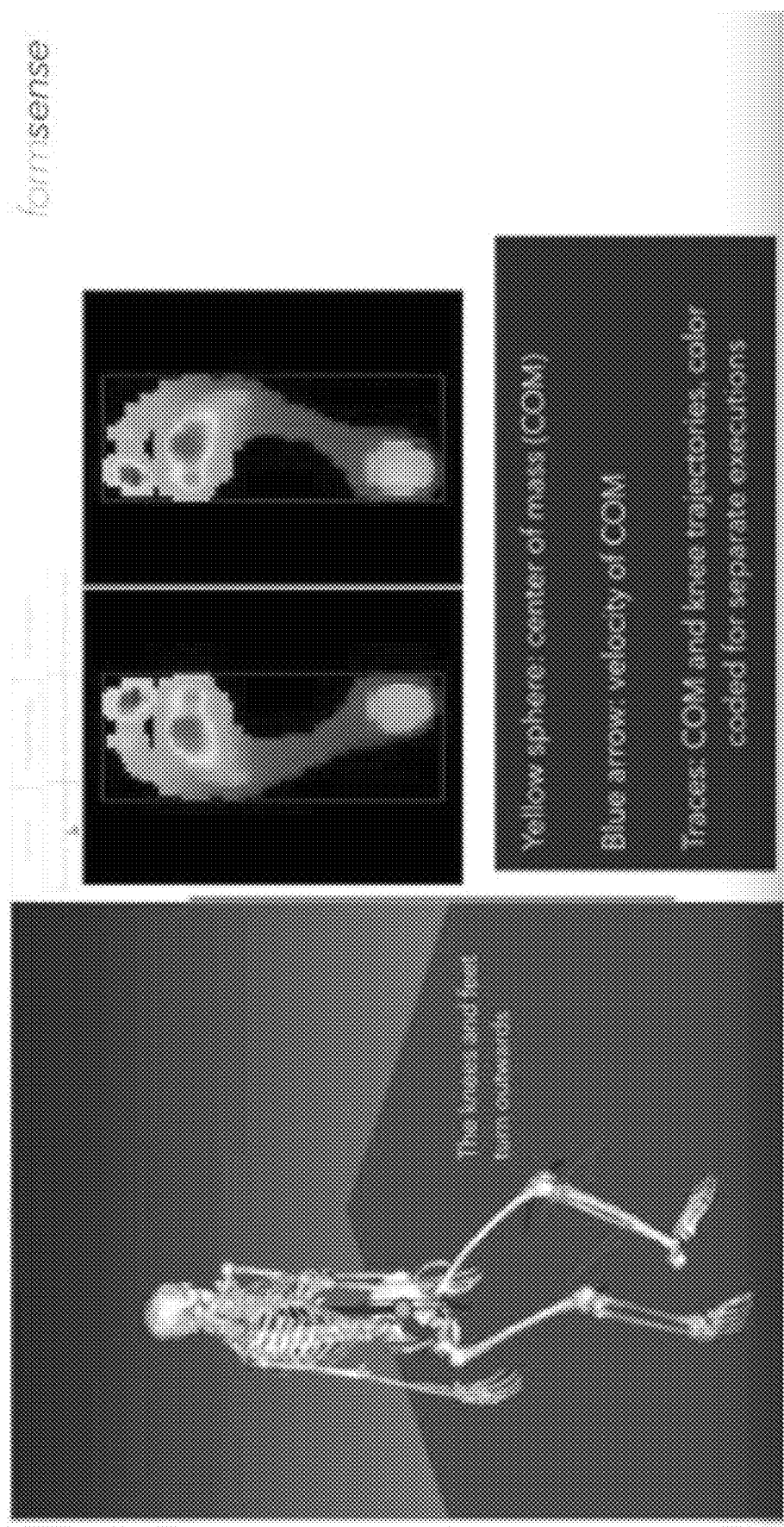
Figure 26:
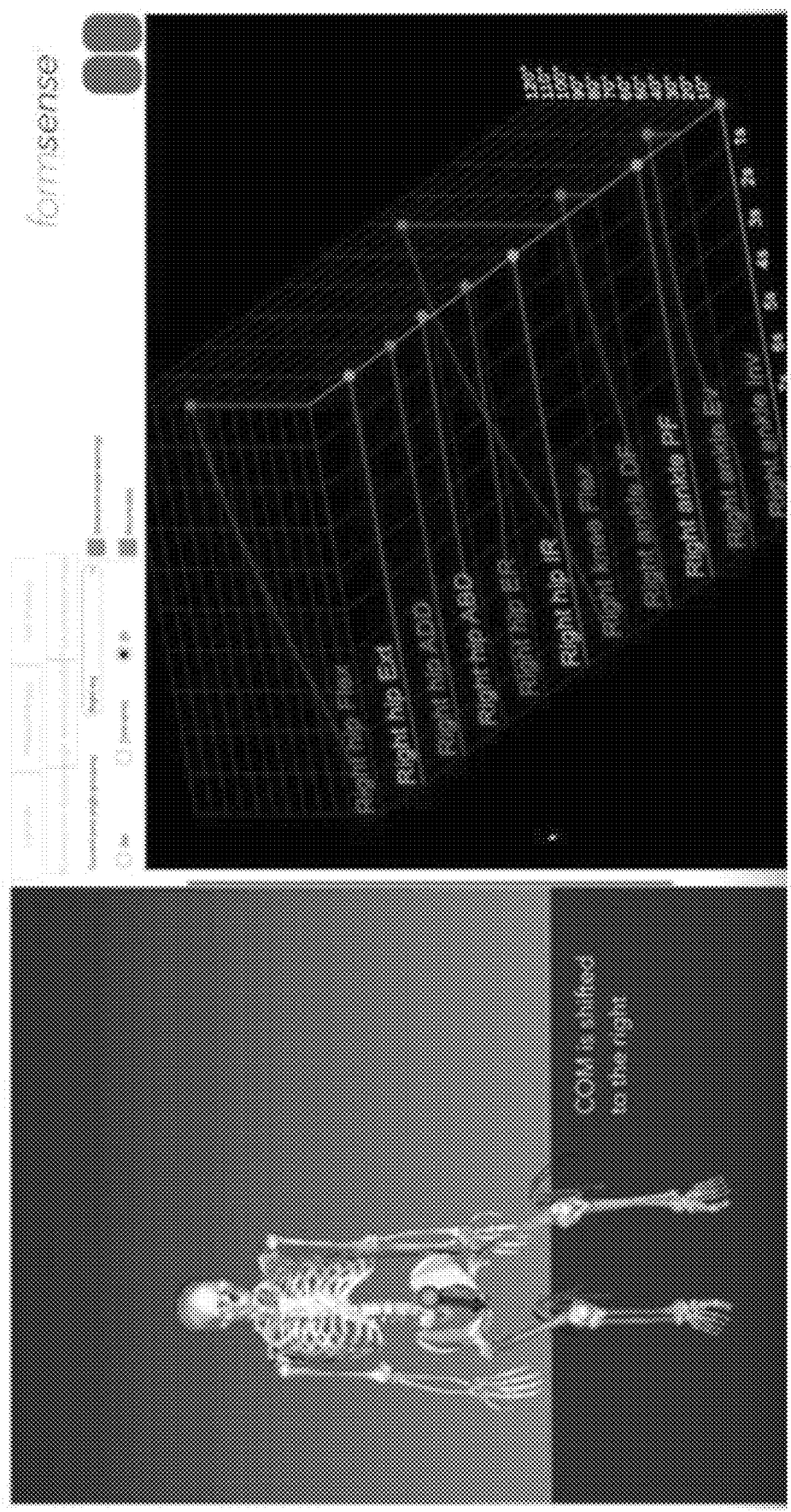
Figure 27:
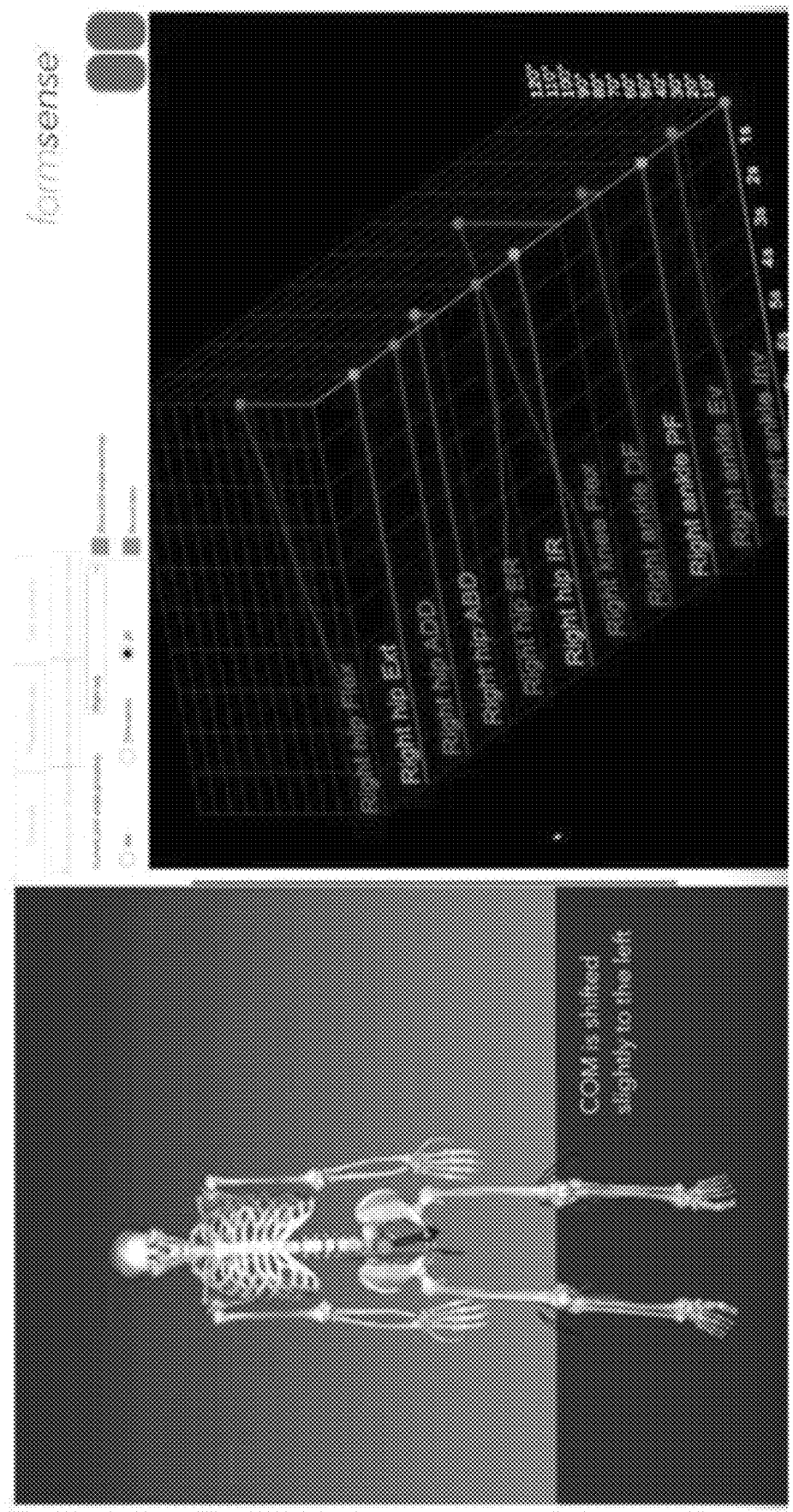
Figure 28:
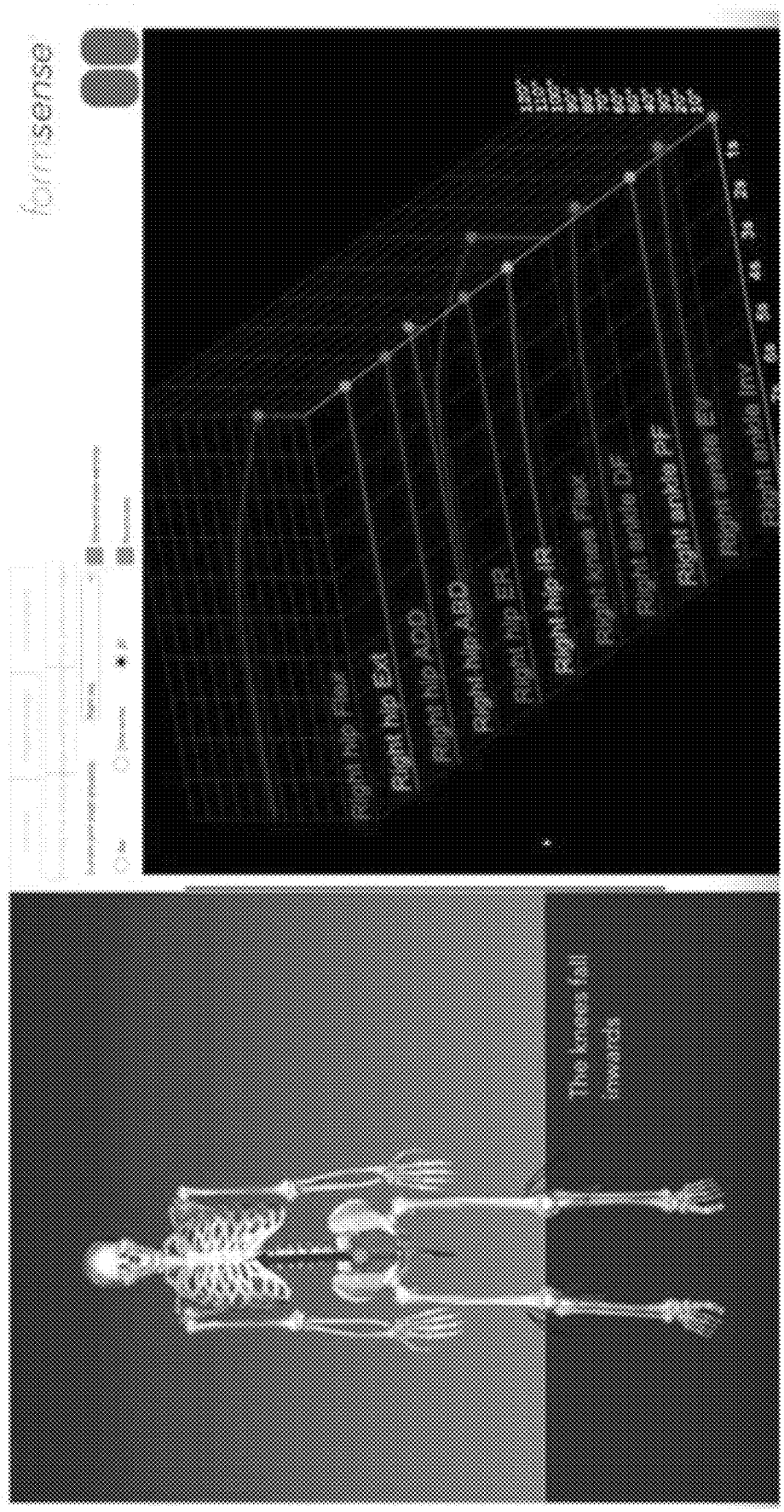
Figure 29:
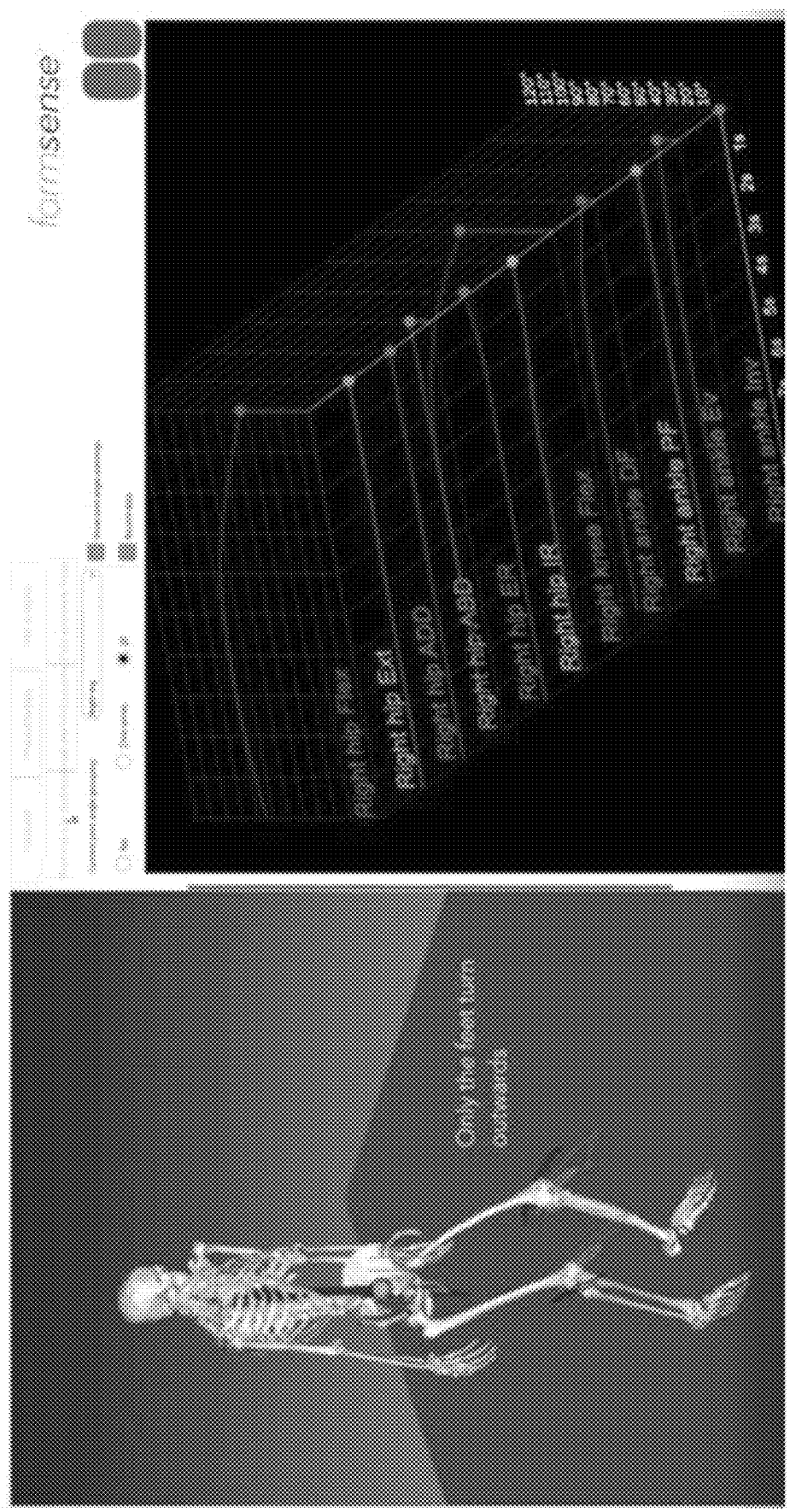

FIGS. 16 and 17 illustrate a movement reconstruction and stimulation block diagram.

FIG. 18A-18D illustrate a graphical display that can be generate and displayed, for example, by the base station.

FIGS. 19-22 illustrate images of examples of the wiring harness coupled to sensors of the garment and also coupled to a hub.

The hub and the base station can include means for performing the functionality described above, including various hardware and/or software component(s) and/or module(s), including, but not limited to, a circuit, an application specific integrated circuit (ASIC), or processor. The hub and the base station can also include storage means, for example, RAM, ROM, and other physical storage mediums. Further, it should be appreciated that modules and/or other appropriate means for performing the methods and techniques described herein can be downloaded and/or otherwise obtained by a user terminal and/or base station as applicable. For example, the base station can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that the hub and the base station can obtain the various methods upon coupling or providing the storage means to the device. Moreover, any other suitable technique for providing the methods and techniques described herein to a device can be utilized.

The various illustrative logical blocks, modules, processors and circuits described in connection with this disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

As one of skill in the art will appreciate, the steps of a method or algorithm described in connection with the present disclosure may be embodied directly in hardware, in a software module executed by a processor, or in a combination of the two. A software module may reside in any form of storage medium that is known in the art, including memory that may be part of a microprocessor or in communication with a microprocessor. Some examples of storage media that may be used include, but are not limited to, random access memory (RAM), read only memory (ROM), flash memory, erasable programmable read-only memory (EPROM), electrically erasable programmable read-only memory (EEPROM), registers, a hard disk, a removable disk including removable optical media, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein may include one or more steps or actions for achieving a described method. The method steps and/or actions may be interchanged with one another without departing from the scope of the invention. In other words, unless a specific order of steps or actions is specified, the order and/or use of specific steps and/or actions may be modified without departing from the scope of the disclosure. The functions described may be implemented in hardware, software, firmware, or any combination thereof. If implemented in hardware, an example hardware configuration may comprise a processing system in a device including one or more computer processors (hardware). A processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

In some embodiments, the processing system may be configured as a general-purpose processing system with one or more microprocessors providing the processor functionality and external memory providing at least a portion of the machine-readable media, all linked together with other supporting circuitry through an external bus architecture. In some embodiments, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. In some embodiments, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from another storage medium when a triggering event occurs. During execution of the software module, the processor may load some of the instructions into cache to increase access speed. When referring to the functionality of a software module below, it will be understood that such functionality is implemented by the processor when executing instructions from that software module.

Some embodiments may comprise a computer program product for performing the operations presented herein. For example, such a computer program product may comprise a computer-readable medium having instructions stored (and/or encoded) thereon, the instructions being executable by one or more processors to perform the operations described herein. If implemented in software, functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. Thus, in some embodiments a computer-readable media may comprise non-transitory computer-readable media (e.g., tangible media). Combinations of the above should also be included within the scope of computer-readable media.

What is claimed is:

1. A form analysis system, comprising:
   a flexible garment comprising tights, the tights having portions that extend from the lower back of a user, along legs of the user, along shins of the user, and along the feet of the user;
   seven sensors positioned on the tights, each of the sensors comprising an accelerometer, a gyroscope, and a magnetometer, the seven sensors positioned on the tights to align with body parts of the user such that each body part that a sensor is aligned with is separated by a joint from an adjacent body part that another sensor is aligned with, wherein the seven sensors are positioned on the tights so that when the tights are worn by the user:
   a left foot sensor is positioned on the tights at a location that aligns with a top of a left foot of the user,
   a right foot sensor is positioned on the tights at a location that aligns with a top of a right foot of the user,
   a left shin sensor is positioned on the tights at a location that aligns with a left shin of the user such that a left ankle joint is between the left shin sensor and the left foot sensor,
   a right shin sensor is positioned on the tights at a location that aligns with a right shin of the user such that a right ankle joint is between the right shin sensor and the right foot sensor,
   a left femur sensor is positioned on the tights at a location aligned with a left femur of the user such that a left knee joint is between the left shin sensor and the left femur sensor,
   a right femur sensor is positioned on the tights at a location that aligns with a right femur of the user such that a right knee joint is positioned between the right shin sensor and the right femur sensor, and
   a sacrum sensor is positioned on the tights at a location that aligns with a sacrum of the user such that a left hip joint is positioned between the right femur sensor and the sacrum sensor, and such that a right hip joint is positioned between the left femur sensor and the sacrum sensor;
   a harness sewn into the tights, the harness electrically coupled to each of the seven sensors, the harness having stretchable wiring for communicating signals generated by each of the seven sensors;
   a hub electrically coupled to the harness and including a transmitter, the hub configured to
   receive signals from each of the seven sensors, the signals including accelerometer data, gyroscope data, and magnetometer data,
   process the received signals, and
   transmit, using the transmitter, information related to the signals to a control device; and
   a control device having a display, the control device configured to receive information from the hub, and generate and display information related to the user's form based on position and movement information of the user's feet, shins, femurs, and back sensed by the seven sensors.

2. The form analysis system of claim 1, wherein at least a portion of the harness and the sensor array are enclosed in a portion of the garment.

3. The form analysis system of claim 1, wherein the transmitter of the hub is a wireless transmitter.

4. The form analysis system of claim 1, further comprising a base station comprising a display and one or more hardware processors.

5. The form analysis system of claim 4, wherein the control device is a base station comprising a docking station configured to receive the hub and couple to the hub to allow communication between the hub and the base station through a direct physical connection.

6. The form analysis system of claim 5, wherein the docking station is configured to receive a plurality of hubs and couple to the plurality of hubs to allow communication between the hubs and the base station through direct physical connections.

7. The form analysis system of claim 4, wherein the base station is configured to generate and display an avatar representation of a wearer of the garment based on information received from the hub.

8. The form analysis system of claim 1, wherein the hub is removably attachable to the harness.

9. The form analysis system of claim 1, wherein the form analysis system further comprises a signal device coupled to the garment, the signal device configured to provide audible, vibratory, or sensory feedback based on a signal received from the control device.

10. The form analysis system of claim 1, wherein the control device is further configured to generate and display information related to the user's form in real time.

11. The form analysis system of claim 1, wherein the left and right foot sensors, the left and right shin sensors, and the left and right femur sensors are aligned symmetrically on the tights.

12. The form analysis system of claim 1, wherein the hub is positioned on the tights to align with the left or right side of the back of the user when the user is wearing the tights.

13. The form analysis system of claim 1, wherein the left and right shin sensor are each positioned, on the tights, closer to a knee joint of the user than an ankle joint of the user.

14. The form analysis system of claim 13, wherein the left and right shin sensor are positioned on the tights at a location such that each is approximately 25% of the distance from the knee to the ankle, closer to a knee joint of the user.

15. The form analysis system of claim 1, wherein the left and right femur sensor are positioned on the tights each at a location between the edge of the hip and the knee joint closer to the edge of the hip.

16. The form analysis system of claim 15, wherein the left and right femur sensor are positioned at a location such that it is approximately 40% of the distance between the edge of the hip and the knee joint of the user, closer to the knee joint.

17. The form analysis system of claim 1, wherein the sacrum sensor is positioned on the tights at a location such that it is aligned to lie between the posterior superior iliac spines on the pelvis and on the upper part of the sacrum surface.

18. The form analysis system of claim 1, wherein the sacrum sensor is positioned on the tights at a location such that it is aligned to lie between the posterior superior iliac spines on the pelvis and on the upper part of the sacrum surface, wherein the left and right femur sensor are positioned at a location such that it is approximately 40% of the distance between the edge of the respective left and right hip joint and the respective left and right knee joint of the user closer to the respective left and right knee joint of the user, and wherein the left and right shin sensor are positioned on the tights at a location such that each is approximately 25% of the distance from the respective left and right knee joint to the respective left and right ankle joint, closer to the respective left and right knee joint of the user, and wherein the left and right foot sensor are positioned on the tights to align with 2nd and 3rd metatarsal bones of the respective left and right foot of the user.

19. The form analysis system of claim 1, wherein the control device is further configured to generate and display information related to the user's form over time.

* * * * *